(12) United States Patent
Chen et al.

(10) Patent No.: US 10,631,276 B2
(45) Date of Patent: Apr. 21, 2020

(54) DATA TRANSMISSION METHOD, BASE STATION, AND TERMINAL DEVICE

(71) Applicant: HUAWEI TECHNOLOGIES CO., LTD., Shenzhen, Guangdong (CN)

(72) Inventors: Jun Chen, Beijing (CN); Yong Xie, Chengdu (CN); Jing Qiu, Chengdu (CN); Yalin Liu, Shenzhen (CN)

(73) Assignee: Huawei Technologies Co., Inc., Shenzhen (CN)

( * ) Notice: Subject to any disclaimer, the term of this patent is extended or adjusted under 35 U.S.C. 154(b) by 0 days.

(21) Appl. No.: 15/923,389

(22) Filed: Mar. 16, 2018

(65) Prior Publication Data

US 2018/0206221 A1 Jul. 19, 2018

Related U.S. Application Data

(63) Continuation of application No. PCT/CN2016/091977, filed on Jul. 28, 2016.

(30) Foreign Application Priority Data

Sep. 18, 2015 (CN) .......................... 2015 1 0600077

(51) Int. Cl.
*H04W 72/04* (2009.01)
*H04L 1/00* (2006.01)
(Continued)

(52) U.S. Cl.
CPC .......... *H04W 72/0406* (2013.01); *H04L 1/00* (2013.01); *H04L 1/0075* (2013.01);
(Continued)

(58) Field of Classification Search
CPC ......... H04W 72/0406; H04W 72/0446; H04W 88/08
See application file for complete search history.

(56) References Cited

U.S. PATENT DOCUMENTS 6,920,150 B1 7/2005 Pauls et al.
9,907,071 B2 * 2/2018 Chen ................ H04W 72/0446
(Continued)

FOREIGN PATENT DOCUMENTS

CN 101695009 A 4/2010
CN 101959284 A 1/2011
(Continued)

OTHER PUBLICATIONS

International Search Report, dated Oct. 19, 2016, in International Application No. PCT/CN2016/091977 (4 pp.).
(Continued)

*Primary Examiner* — Rasheed Gidado
(74) *Attorney, Agent, or Firm* — Rimon PC

(57) ABSTRACT

Embodiments of the present invention provide a data transmission method, a base station, and a terminal device. The method includes: determining first indication information, where the first indication information is used to indicate a coding method that needs to be used for a service channel of to-be-transmitted data; and sending control signaling to a terminal device, where the control signaling includes the first indication information. In the embodiments of the present invention, the base station sends the first indication information to the terminal device by using the control signaling, so that the terminal device determines, according to the first indication information, the coding method that needs to be used for the service channel over which the to-be-transmitted data is transmitted.

16 Claims, 8 Drawing Sheets

100

Determine first indication information, where the first indication information is used to indicate a coding method that needs to be used for a service channel of to-be-transmitted data — S110

Send control signaling to user equipment UE, where the control signaling includes the first indication information — S120

(51) Int. Cl.
  *H04L 1/18* (2006.01)
  *H04W 88/02* (2009.01)
  *H04W 88/08* (2009.01)

(52) U.S. Cl.
  CPC ....... *H04L 1/1896* (2013.01); *H04W 72/0446* (2013.01); *H04W 88/02* (2013.01); *H04W 88/08* (2013.01)

(56) References Cited

U.S. PATENT DOCUMENTS

| | | | |
|---|---|---|---|
| 10,075,309 B2* | 9/2018 | Chen | H04L 1/0016 |
| 2010/0061345 A1* | 3/2010 | Wengerter | H04L 1/0004 370/335 |
| 2011/0223924 A1* | 9/2011 | Lohr | H04W 72/042 455/450 |
| 2011/0269407 A1* | 11/2011 | Koo | H04B 17/27 455/67.11 |
| 2012/0243511 A1 | 9/2012 | Lv et al. | |
| 2014/0016570 A1 | 1/2014 | Ma et al. | |
| 2014/0369292 A1 | 12/2014 | Wu et al. | |
| 2015/0195819 A1* | 7/2015 | Kwon | H04W 72/042 370/329 |
| 2015/0200746 A1* | 7/2015 | Pan | H04L 1/00 370/329 |
| 2015/0237644 A1 | 8/2015 | Golitschek Edler Von Elbwart et al. | |

FOREIGN PATENT DOCUMENTS

| | | |
|---|---|---|
| CN | 102013938 A | 7/2012 |
| CN | 103096488 A | 5/2013 |
| CN | 103209487 A | 7/2013 |
| EP | 2 757 849 B1 | 3/2016 |

OTHER PUBLICATIONS

XP050716559 R1-133451 NTT DOCOMO, "HARQ Design for eIMTA", 3GPP TSG RAN WG1 Meeting #74,Barcelona, Spain, Aug. 19-23, 2013, total 7 pages.

XP050992765 R1-154234 LG Electronics, "Details on DCI contents for MTC", 3GPP TSG RAN WG1 Meeting #82, Beijing, China, Aug. 24-28, 2015, total 6 pages.

Extended European Search Report dated Aug. 7, 2018 in corresponding European Patent Application No. 16845601.0, 11 pgs.

"3$^{rd}$ Generation Partnership Project; Technical Specification Group Radio Access Network; Evolved Universal Terrestrial Radio Access (E-UTRA); Multiplexing and channel coding (Release 12)," 3GPP TS 36.212, V12.5.0, Jun. 2015, 94 pgs.

"3$^{rd}$ Generation Partnership Project; Technical Specification Group Radio Access Network; Evolved Universal Terrestrial Radio Access (E-UTRA); Physical layer procedures (Release 12)," 3GPP TS 36.213, V12.6.0, Jun. 2015, 241 pgs.

International Search Report dated Oct. 19, 2016, in corresponding International Patent Application No. PCT/CN2016/091977, 4 pgs.

* cited by examiner

DATA TRANSMISSION METHOD, BASE STATION, AND TERMINAL DEVICE

CROSS-REFERENCE TO RELATED APPLICATIONS

This application is a continuation of international Application No. PCT/CN2016/091977, filed on Jul. 28, 2016, which claims priority to Chinese Patent Application No. 201510600077.7, filed on Sep. 18, 2015, The disclosures of the aforementioned applications are hereby incorporated by reference in their entireties.

TECHNICAL FIELD

The present application relates to the communications field, and more specifically, to a data transmission method, a base station, and a terminal device in the communications field.

BACKGROUND

Basic parameters at an air-interface physical layer in a long term evolution (LTE for short) system are mostly constant. For example, a subcarrier spacing is 15 KHz, a length of a transmission time interval (TTI for short) is 1 ms, and a quantity of symbols in a timeslot is seven orthogonal frequency division multiplexing (OFDM for short) symbols. Most parameters in the LIE system are not adjusted dynamically. A base station in the LIE system sends a data transport block (TB for short) to user equipment LE by using a physical downlink shared channel (PDSCH for short). Currently, a modulation and coding scheme for the PDSCH is Turbo coding. After detecting data transmission over the PDSCH, a terminal device feeds back information about a hybrid automatic repeat request—acknowledgment (HARQ-ACK for short) to the base station by using a physical uplink control channel (PUCCH for short). The HARQ-ACK may be an acknowledgment (ACK for short) or a negative acknowledgment (NACK for short), that is, an ACK/NACK response.

Currently, a coding method for a downlink shared channel (DL-SCH for short) and an uplink shared channel (UL-SCH for short) of a data transmission service in LTE is Turbo coding. Coding and modulation schemes for these channel types are all corresponding to Turbo codes. An input bit length of a Turbo-code encoder ranges from 40 bits to 6144 bits. For a data service less than 40 bits, that is, a small data packet, Turbo codes are inapplicable because of relatively poor performance.

In addition, LTE uses a fixed frame structure, for example, a fixed subcarrier spacing, a fixed TTI length, a fixed quantity of symbols, a fixed cyclic prefix (CP for short) configuration, and other fixed parameters; feedback information sent by a corresponding terminal device has a fixed feedback delay, and the feedback delay is at least 4 ms. When a low-delay type service in a communications system requires that a delay be less than 4 ms, a method in which a fixed frame structure is used for data transmission is inapplicable.

It can be learnt that a main configuration of a service channel in a current LTE system is fixed and cannot meet requirements of different services or scenarios.

SUMMARY

Embodiments of the present invention provide a data transmission method, a base station, and a terminal device, so that different coding methods can be determined for different to-be-transmitted data.

According to a first aspect, a data transmission method is provided, including: determining first indication information, where the first indication information is used to indicate a coding method that needs to be used for a service channel of to-be-transmitted data; and sending control signaling to a terminal device, where the control signaling includes the first indication information.

With reference to the first aspect, in a first implementation of the first aspect, the determining first indication information includes: using an index number as the first indication information, where a first correspondence exists between the index number and the coding method.

With reference to the first aspect and the foregoing implementation of the first aspect, in a second implementation of the first aspect, the first correspondence is indicated as a modulation and coding scheme MCS table, and the MCS table includes the index number and the coding method corresponding to the index number.

With reference to the first aspect and the foregoing implementation of the first aspect, in a third implementation of the first aspect, the MCS table further includes a modulation order corresponding to the index number.

With reference to the first aspect and the foregoing implementations of the first aspect, in a fourth implementation of the first aspect, the determining first indication information includes: using a service channel type and or a transmission time interval TTI type as the first indication information, where a second correspondence exists between the service channel type and/or transmission time interval TTI type and the coding method.

With reference to the first aspect and the foregoing implementations of the first aspect, in a fifth implementation of the first aspect, the determining first indication information includes: using a feedback delay type as the first indication information, where a correspondence exists between the feedback delay type and the coding method.

With reference to the first aspect and the foregoing implementations of the first aspect, in a sixth implementation of the first aspect, the first indication information is further used to indicate a feedback delay type, and a third correspondence exists between the first indication information and the feedback delay type.

With reference to the first aspect and the foregoing implementations of the first aspect, in a seventh implementation of the first aspect, the control signaling further includes second indication information, where the second indication information is used to indicate a feedback delay type; and before the sending control signaling to a terminal device, the method further includes: determining the second indication information.

With reference to the first aspect and the foregoing implementations of the first aspect, in an eighth implementation of the first aspect, the feedback delay type is a quantity of subframes in an interval between a subframe for service data transmission and a subframe for feedback information transmission.

With reference to the first aspect and the foregoing implementation of the first aspect, in a ninth implementation of the first aspect, for a communications system in time division multiplexing TDD mode, the quantity of subframes in the interval is 0 when one subframe corresponds to one TTI length and the one subframe includes a downlink transmission time and an uplink transmission time.

With reference to the first aspect and the foregoing implementations of the first aspect, in a tenth implementation of the first aspect, the method further includes: sending service data to the terminal device, where the coding method is used for the service channel over which the service data is sent; and receiving feedback information sent by the terminal device.

With reference to the first aspect and the foregoing implementations of the first aspect, in an eleventh implementation of the first aspect, a subframe for transmitting the feedback information is determined by the terminal device according to the feedback delay type.

With reference to the first aspect and the foregoing implementations of the first aspect, in a twelfth implementation of the first aspect, the control signaling is scheduling signaling.

With reference to the first aspect and the foregoing implementations of the first aspect, in a thirteenth implementation of the first aspect, the coding method includes at least one of polar coding, rateless Rateless coding, Turbo coding, low-density parity-check coding LDPC coding, or convolutional coding.

According to a second aspect, a data transmission method is provided, including: receiving control signaling sent by a base station, where the control signaling includes first indication information, and the first indication information is used to indicate a coding method that needs to be used for a service channel of to-be-transmitted data; and determining, according to the first indication information, the coding method that needs to be used for the service channel.

With reference to the second aspect, in a first implementation of the second aspect, the method further includes: receiving service data sent by the base station, where the coding method is used for the service channel over which the service data is transmitted; and sending feedback information to the base station.

With reference to the second aspect and the foregoing implementation of the second aspect, in a second implementation of the second aspect, the first indication information is an index number, and a first correspondence exists between the index number and the coding method.

With reference to the second aspect and the foregoing implementation of the second aspect, in a third implementation of the second aspect, the first correspondence is indicated as a modulation and coding scheme MCS table, and the MCS table includes the index number and the coding method corresponding to the index number.

With reference to the second aspect and the foregoing implementation of the second aspect, in a fourth implementation of the second aspect, the MCS table further includes a modulation order corresponding to the index number.

With reference to the second aspect and the foregoing implementation of the second aspect, in a fifth implementation of the second aspect, the first indication information is a service channel type and/or a transmission time interval TTI type, and a second correspondence exists between the service channel type and/or the TTI type and the coding method.

With reference to the second aspect and the foregoing implementation of the second aspect, in a sixth implementation of the second aspect, the first indication information is a feedback delay type, and a correspondence exists between the feedback delay type and the coding method.

With reference to the second aspect and the foregoing implementations of the second aspect, in a seventh implementation of the second aspect, the first indication information is further used to indicate a feedback delay type, and a third correspondence exists between the first indication information and the feedback delay type.

With reference to the second aspect and the foregoing implementation of the second aspect, in an eighth implementation of the second aspect, the control signaling further includes second indication information, and the second indication information is used to indicate a feedback delay type of the feedback information.

With reference to the second aspect and the foregoing implementations of the second aspect, in a ninth implementation of the second aspect, before the sending feedback information to the base station, the method further includes: determining, according to the first indication information, a subframe for transmitting the feedback information; and the sending feedback information to the base station includes: sending the feedback information to the base station in the subframe.

With reference to the second aspect and the foregoing implementations of the second aspect, in a tenth implementation of the second aspect, the feedback delay type is a quantity of subframes in an interval between a subframe for service data transmission and a subframe for feedback information transmission.

With reference to the second aspect and the foregoing implementation of the second aspect, in an eleventh implementation of the second aspect, for a communications system in time division multiplexing TDD mode, the quantity of subframes in the interval is 0 when one subframe corresponds to one TTI length and the one subframe includes a downlink transmission time and an uplink transmission time.

With reference to the second aspect and the foregoing implementations of the second aspect, in a twelfth implementation of the second aspect, the control signaling is scheduling signaling.

With reference to the second aspect and the foregoing implementations of the second aspect, in a thirteenth implementation of the second aspect, the coding method includes at least one of polar coding, rateless Rateless coding, Turbo coding, low-density parity-check coding LDPC coding, or convolutional coding.

According to a third aspect, a base station for data transmission is provided, including: a processing unit, configured to determine first indication information, where the first indication information is used to indicate a coding method that needs to be used for a service channel of to-be-transmitted data; and a sending unit, configured to send control signaling to a terminal device, where the control signaling includes the first indication information.

With reference to the third aspect, in a first implementation of the third aspect, the processing unit is specifically configured to use an index number as the first indication information, where a first correspondence exists between the index number and the coding method.

With reference to the third aspect and the foregoing implementation of the third aspect, in a second implementation of the third aspect, the first correspondence is indicated as a modulation and coding scheme MCS table, and the MCS table includes the index number and the coding method corresponding to the index number.

With reference to the third aspect and the foregoing implementation of the third aspect, in a third implementation of the third aspect, the MCS table further includes a modulation order corresponding to the index number.

With reference to the third aspect and the foregoing implementations of the third aspect, in a fourth implementation of the third aspect, the processing unit is specifically configured to use a service channel type and/or a transmission time interval TTI type as the first indication information, where a second correspondence exists between the service channel type and/or transmission time interval TTI type and the coding method.

With reference to the third aspect and the foregoing implementations of the third aspect, in a fifth implementation of the third aspect, the processing unit is specifically configured to use a feedback delay type as the first indication information, where a correspondence exists between the feedback delay type and the coding method.

With reference to the third aspect and the foregoing implementations of the third aspect, in a sixth implementation of the third aspect, the first indication information determined by the processing unit is specifically further used to indicate a feedback delay type, and a third correspondence exists between the first indication information and the feedback delay type.

With reference to the third aspect and the foregoing implementations of the third aspect, in a seventh implementation of the third aspect, the control signaling sent by the sending unit further includes second indication information, and the second indication information is used to indicate a feedback delay type; and before the sending unit sends the control signaling to the terminal device, the processing unit is specifically further configured to determine the second indication information.

With reference to the third aspect and the foregoing implementations of the third aspect, in an eighth implementation of the third aspect, the feedback delay type is a quantity of subframes in an interval between a subframe for service data transmission and a subframe for feedback information transmission.

With reference to the third aspect and the foregoing implementation of the third aspect, in a ninth implementation of the third aspect, for a communications system in time division multiplexing TDD mode, the quantity of subframes in the interval is 0 when one subframe corresponds to one TTI length and the one subframe includes a downlink transmission time and an uplink transmission time.

With reference to the third aspect and the foregoing implementations of the third aspect, in a tenth implementation of the third aspect, the sending unit is further configured to send service data to the terminal device, where the coding method is used for the service channel over which the service data is sent; and the apparatus further includes a receiving unit, configured to receive feedback information sent by the terminal device.

With reference to the third aspect and the foregoing implementations of the third aspect, in an eleventh implementation of the third aspect, a subframe for transmitting the feedback information is determined by the terminal device according to the feedback delay type.

With reference to the third aspect and the foregoing implementations of the third aspect, in a twelfth implementation of the third aspect, the control signaling sent by the sending unit is scheduling signaling.

With reference to the third aspect and the foregoing implementations of the third aspect, in a thirteenth implementation of the third aspect, the coding method includes at least one of polar coding, rateless Rateless coding, Turbo coding, low-density parity-check coding LINT coding, or convolutional coding.

According to a fourth aspect, a terminal device for data transmission is provided, including a receiving unit, configured to receive control signaling sent by a base station, where the control signaling includes first indication information, and the first indication information is used to indicate a coding method that needs to be used for a service channel of to-be-transmitted data; and a processing unit, configured to determine, according to the first indication information, the coding method that needs to be used for the service channel.

With reference to the fourth aspect, in a first implementation of the fourth aspect, the receiving unit is further configured to receive service data sent by the base station, where the coding method is used for the service channel over which the service data is transmitted; and the terminal device further includes a sending unit, configured to send feedback information to the base station.

With reference to the fourth aspect and the foregoing implementation of the fourth aspect, in a second implementation of the fourth aspect, the first indication information is an index number, and a first correspondence exists between the index number and the coding method.

With reference to the fourth aspect and the foregoing implementation of the fourth aspect, in a third implementation of the fourth aspect, the first correspondence is indicated as a modulation and coding scheme MCS table, and the MCS table includes the index number and the coding method corresponding to the index number.

With reference to the fourth aspect and the foregoing implementation of the fourth aspect, in a fourth implementation of the fourth aspect, the MCS table further includes a modulation order corresponding to the index number.

With reference to the fourth aspect and the foregoing implementation of the fourth aspect, in a fifth implementation of the fourth aspect, the first indication information is a service channel type and/or a transmission time interval TTI type, and a second correspondence exists between the service channel type and/or the TTI type and the coding method.

With reference to the fourth aspect and the foregoing implementation of the fourth aspect, in a sixth implementation of the fourth aspect, the first indication information is a feedback delay type, and a correspondence exists between the feedback delay type and the coding method.

With reference to the fourth aspect and the foregoing implementations of the fourth aspect, in a seventh implementation of the fourth aspect, the first indication information is further used to indicate a feedback delay type, and a third correspondence exists between the first indication information and the feedback delay type.

With reference to the fourth aspect and the foregoing implementation of the fourth aspect, in an eighth implementation of the fourth aspect, the control signaling received by the receiving unit further includes second indication information, and the second indication information is used to indicate a feedback delay type of the feedback information.

With reference to the fourth aspect and the foregoing implementations of the fourth aspect, in a ninth implementation of the fourth aspect, before the sending unit sends the feedback information to the base station, the processing unit is further configured to determine, according to the first indication information included in the control signaling received by the receiving unit, a subframe for transmitting the feedback information; and the sending unit is specifically configured to send the feedback information to the base station in the subframe.

With reference to the fourth aspect and the foregoing implementations of the fourth aspect, in a tenth implementation of the fourth aspect, the feedback delay type is a quantity of subframes in an interval between a subframe for service data transmission and a subframe for feedback information transmission.

With reference to the fourth aspect and the foregoing implementation of the fourth aspect, in an eleventh implementation of the fourth aspect, for a communications system in time division multiplexing TDD mode, the quantity of subframes in the interval is 0 when one subframe corresponds to one TTI length and the one subframe includes a downlink transmission time and an uplink transmission time.

With reference to the fourth aspect and the foregoing implementations of the fourth aspect, in a twelfth implementation of the fourth aspect, the control signaling received by the receiving unit is scheduling signaling.

With reference to the fourth aspect and the foregoing implementations of the fourth aspect, in a thirteenth implementation of the fourth aspect, the coding method includes at least one of polar coding, rateless Rateless coding, Turbo coding, low-density parity-check coding WPC coding, or convolutional coding.

According to a fifth aspect, a base station for data transmission is provided, including a processor, a memory, a bus system, and a transmitter; the processor is configured to determine first indication information, where the first indication information is used to indicate a coding method that needs to be used for a service channel of to-be-transmitted data; and the transmitter is configured to send control signaling to a terminal device, where the control signaling includes the first indication information.

With reference to the fifth aspect, in a first implementation of the fifth aspect, the processor is specifically configured to use an index number as the first indication information, where a first correspondence exists between the index number and the coding method.

With reference to the fifth aspect and the foregoing implementation of the fifth aspect, in a second implementation of the fifth aspect, the first correspondence is indicated as a modulation and coding scheme MCS table, and the MCS table includes the index number and the coding method corresponding to the index number.

With reference to the fifth aspect and the foregoing implementation of the fifth aspect, in a third implementation of the fifth aspect, the MCS table further includes a modulation order corresponding to the index number.

With reference to the fifth aspect and the foregoing implementations of the fifth aspect, in a fourth implementation of the fifth aspect, the processor is specifically configured to use a service channel type and/or a transmission time interval TTI type as the first indication information, where a second correspondence exists between the service channel type and/or transmission time interval TTI type and the coding method.

With reference to the fifth aspect and the foregoing implementations of the fifth aspect, in a fifth implementation of the fifth aspect, the processor is specifically configured to use a feedback delay type as the first indication information, where a correspondence exists between the feedback delay type and the coding method.

With reference to the fifth aspect and the foregoing implementations of the fifth aspect, in a sixth implementation of the fifth aspect, the first indication information determined by the processor is specifically further used to indicate a feedback delay type, and a fifth correspondence exists between the first indication information and the feedback delay type.

With reference to the fifth aspect and the foregoing implementations of the fifth aspect, in a seventh implementation of the fifth aspect, the control signaling sent by the transmitter further includes second indication information, and the second indication information is used to indicate a feedback delay type; and before the transmitter sends the control signaling to the terminal device, the processor is specifically further configured to determine the second indication information.

With reference to the fifth aspect and the foregoing implementations of the fifth aspect, in an eighth implementation of the fifth aspect, the feedback delay type is a quantity of subframes in an interval between a subframe for service data transmission and a subframe for feedback information transmission.

With reference to the fifth aspect and the foregoing implementation of the fifth aspect, in a ninth implementation of the fifth aspect, for a communications system in time division multiplexing TDD mode, the quantity of subframes in the interval is 0 when one subframe corresponds to one TTI length and the one subframe includes a downlink transmission time and an uplink transmission time.

With reference to the fifth aspect and the foregoing implementations of the fifth aspect, in a tenth implementation of the fifth aspect, the transmitter is further configured to send service data to the terminal device, where the coding method is used for the service channel over which the service data is sent; and the apparatus further includes a receiver, configured to receive feedback information sent by the terminal device.

With reference to the fifth aspect and the foregoing implementations of the fifth aspect, in an eleventh implementation of the fifth aspect, a subframe for transmitting the feedback information is determined by the terminal device according to the feedback delay type.

With reference to the fifth aspect and the foregoing implementations of the fifth aspect, in a twelfth implementation of the fifth aspect, the control signaling sent by the transmitter is scheduling signaling.

With reference to the fifth aspect and the foregoing implementations of the fifth aspect, in a thirteenth implementation of the fifth aspect, the coding method includes at least one of polar coding, rateless Rateless coding, Turbo coding, low-density parity-check coding LDPC coding, or convolutional coding.

According to a sixth aspect, a terminal device for data transmission is provided, including a processor, a memory, a bus system, and a receiver; the receiver is configured to receive control signaling sent by a base station, where the control signaling includes first indication information, and the first indication information is used to indicate a coding method that needs to be used for a service channel of to-be-transmitted data; and the processor is configured to determine, according to the first indication information, the coding method that needs to be used for the service channel.

With reference to the sixth aspect, in a first implementation of the sixth aspect, the receiver is further configured to receive service data sent by the base station, where the coding method is used for the service channel over which the service data is transmitted; and the terminal device further includes a transmitter, configured to send feedback information to the base station.

With reference to the sixth aspect and the foregoing implementation of the sixth aspect, in a second implementation of the sixth aspect, the first indication information is an index number, and a first correspondence exists between the index number and the coding method.

With reference to the sixth aspect and the foregoing implementation of the sixth aspect, in a third implementation of the sixth aspect, the first correspondence is indicated as a modulation and coding scheme MCS table, and the MCS table includes the index number and the coding method corresponding to the index number.

With reference to the sixth aspect and the foregoing implementation of the sixth aspect, in a fourth implementation of the sixth aspect, the MCS table further includes a modulation order corresponding to the index number.

With reference to the sixth aspect and the foregoing implementation of the sixth aspect, in a fifth implementation of the sixth aspect, the first indication information is a service channel type and/or a transmission time interval TTI type, and a second correspondence exists between the service channel type and/or the TTI type and the coding method.

With reference to the sixth aspect and the foregoing implementation of the sixth aspect, in a sixth implementation of the sixth aspect, the first indication information is a feedback delay type, and a correspondence exists between the feedback delay type and the coding method.

With reference to the sixth aspect and the foregoing implementations of the sixth aspect, in a seventh implementation of the sixth aspect, the first indication information is further used to indicate a feedback delay type, and a third correspondence exists between the first indication information and the feedback delay type.

With reference to the sixth aspect and the foregoing implementation of the sixth aspect, in an eighth implementation of the sixth aspect, the control signaling received by the receiver further includes second indication information, and the second indication information is used to indicate a feedback delay type of the feedback information.

With reference to the sixth aspect and the foregoing implementations of the sixth aspect, in a ninth implementation of the sixth aspect, before the transmitter sends the feedback information to the base station, the processor is further configured to determine, according to the first indication information included in the control signaling received by the receiver, a subframe for transmitting the feedback information; and the transmitter is specifically configured to send the feedback information to the base station in the subframe.

With reference to the sixth aspect and the foregoing implementations of the sixth aspect, in a tenth implementation of the sixth aspect, the feedback delay type is a quantity of subframes in an interval between a subframe for service data transmission and a subframe for feedback information transmission.

With reference to the sixth aspect and the foregoing implementation of the sixth aspect, in an eleventh implementation of the sixth aspect, for a communications system in time division multiplexing TDD mode, the quantity of subframes in the interval is 0 when one subframe corresponds to one TTI length and the one subframe includes a downlink transmission time and an uplink transmission time.

With reference to the sixth aspect and the foregoing implementations of the sixth aspect, in a twelfth implementation of the sixth aspect, the control signaling received by the receiver is scheduling signaling.

With reference to the sixth aspect and the foregoing implementations of the sixth aspect, in a thirteenth implementation of the sixth aspect, the coding method includes at least one of polar coding, rateless Rateless coding, Turbo coding, low-density parity-check coding UPC coding, or convolutional coding.

In the embodiments of the present invention, the base station determines the first indication information, where the first indication information is used to indicate the coding method that needs to be used for the service channel of the to-be-transmitted data, and the base station sends the first indication information to the terminal device by sending the control signaling to the terminal device, so that the terminal device determines, according to the first indication information, the coding method that needs to be used for the service channel over which the to-be-transmitted data is transmitted. Therefore, the base station may determine different coding methods for different to-be-transmitted data. This is applicable to different scenarios, and can thereby improve flexibility in use.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

BRIEF DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present application.

In the embodiments of the present invention, a terminal device may be referred to as an access terminal or user equipment (LIE for short), and may be a personal digital proess (PDA for short), a handheld device with a wireless communication function, a computing device, another processing device connected to a wireless modem, an in-vehicle device, a wearable device, or a terminal device in a future 5G network.

In the embodiments of the present invention, a network device may be configured to communicate with the terminal device. The network device may be a relay station, an access point, an in-vehicle device, a wearable device, a base station device in a future 5G network, or the like.

A 5th Generation (5G for short) communications system is an adaptive air interface, and needs to support multiple coding technologies, such as polar coding, rateless coding, Turbo coding, low-density parity-check coding (LDPC for short), and convolutional coding. The adaptive air interface may further need to support an adaptive frame structure, so that entire time-frequency resources can be divided more flexibly. For example, a subcarrier spacing, a transmission time interval TTI length, a quantity of orthogonal frequency division multiplexing OFDM symbols, a CP configuration, and other parameters can be adjusted flexibly. In particular, there are low, medium, and high delay types low/medium/high delay sensitivity) for different scenarios or services, and the system may need to support a smaller delay. Therefore, the future 5G communications system can satisfy multiple important requirements, such as a super-high transmission rate, a large quantity of connections, and high spectral efficiency.

Figure 1:
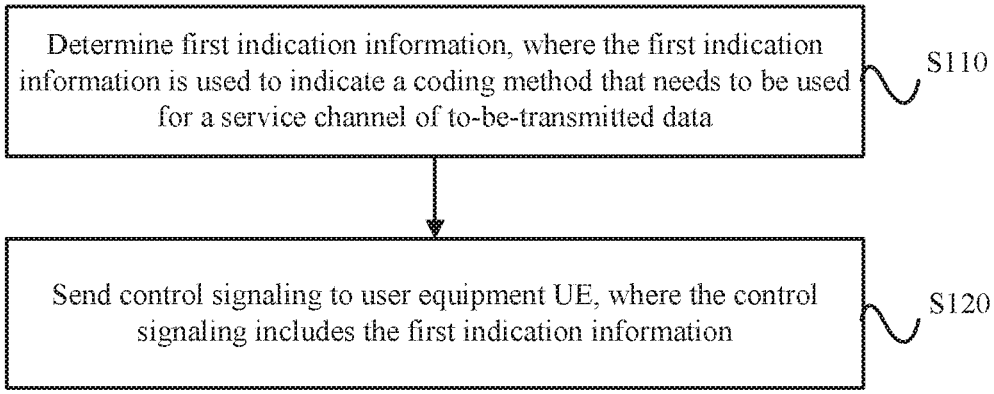
FIG. 1 is a schematic flowchart of a data transmission method according to an embodiment of the present invention.

FIG. 1 shows a data, transmission method 100 according to an embodiment of the present invention. The method 100 may be executed by a network device. The network device may be a base station. As shown in FIG. 1, the method 100 includes the following steps.

S110: Determine first indication information, where the first indication information is used to indicate a coding method that needs to be used for a service channel of to-be-transmitted data.

S120: Send control signaling to a terminal device, where the control signaling includes the first indication information.

Specifically, the base station determines the first indication information, where the first indication information is used to indicate the coding method that needs to be used for the service channel over which the to-be-transmitted data is transmitted. Then, the base station sends the first indication information to the terminal device by sending the control signaling to the terminal device. In this way, the terminal device can determine, according to the first indication information, the coding method that needs to be used for the service channel over which the to-be-transmitted data is transmitted. Further, the terminal device may receive, according to the coding method, the data sent by the base station.

Therefore, in this embodiment of the present invention, the base station may determine different coding methods for different to-be-transmitted data. This is applicable to different scenarios, and can thereby improve flexibility in use.

Optionally, before S110, the method 100 may further include: The base station determines the coding method that needs to be used for the service channel of the to-be-transmitted data. Specifically, the coding method may be determined according to a type of the to-be-transmitted data.

It should be understood that, in this embodiment of the present invention, before sending data 1 to the terminal device, the base station determines a coding method that needs to be used for a service channel over which the data 1 is transmitted, and then performs steps S110 and S120. Similarly, before sending data 2 to the terminal device, the base station determines a coding method that needs to be used for a service channel over which the data 2 is transmitted, and then performs steps S110 and S120.

Optionally, in an embodiment, in S110, the coding method may be used as the first indication information. For example, when the base station determines that the coding method that needs to be used for the service channel of the to-be-transmitted data 1 is C1, C1 may be used as the first indication information.

Optionally, in another embodiment, in S110, an index number may be determined as the first indication information. A first correspondence exists between the index number and the coding method.

Specifically, the base station determines, according to the first correspondence, the index number corresponding to the coding method that needs to be used for the service channel of the to-be-transmitted data, and determines the index number as the first indication information. The index number may be an identifier, such as an Arabic numeral or a letter, that indicates the coding method.

It should be understood that the first correspondence may be preconfigured on the base station and the terminal device. In this embodiment of the present invention, the first correspondence may be updated by updating the base station and the terminal device simultaneously. In addition, after S120, the terminal device may determine, according to the first correspondence, the coding method indicated by the first indication information.

Optionally, the first correspondence may be indicated as a modulation and coding scheme (MCS for short) table.

As shown in Table 1, the MCS table may include the index number and the coding method corresponding to the index number. The index number is an MCS sequence number. After the base station determines, for the to-be-transmitted data, the coding method that needs to be used for the service channel, the base station determines, according to the MCS table, the index number corresponding to the coding method, and uses the index number as the first indication information. For example, when the base station determines that the coding method that needs to be used for the service channel of the to-be-transmitted data 1 is C1, an index number 1 may be used as the first indication information. When the base station determines that the coding method that needs to be used for the service channel of the to-be-transmitted data 2 is C3, an index number 3 may be used as the first indication information.

TABLE 1

| MCS sequence number | Coding method |
| --- | --- |
| 1 | C1 |
| 2 | C2 |
| 3 | C3 |

Optionally, the MCS table may further include a modulation order corresponding to the index number, as shown in Table 2.

TABLE 2

| MCS sequence number | Coding method | Modulation order |
|---|---|---|
| 1 | C1 | Q1 |
| 2 | C1 | Q2 |
| 3 | C1 | Q3 |
| 4 | C2 | Q1 |
| 5 | C2 | Q2 |
| 6 | C2 | Q3 |
| 7 | C3 | Q1 |
| 8 | C3 | Q2 |
| 9 | C3 | Q3 |

In this embodiment of the present invention, the modulation order may be 1, 2, 4, 6, or the like. Different modulation orders correspond to different modulation schemes, for example, binary phase shift keying (BPSK for short), quadrature phase shift keying (QPSK for short), 16 quadrature amplitude modulation (16-QAM for short), and 64-QAM.

For example, for to-be-transmitted data 3, if the base station determines that a coding method that needs to be used for a service channel of the to-be-transmitted data 3 is C2 and a modulation order that needs to be used is Q3, then the base station may determine to use an index number 6 as the first indication information.

In this embodiment of the present invention, the MCS table may further include combination information of a code rate corresponding to the index number, and the MCS table may further include combination information of a quantity of spatial flows and the like corresponding to the index number. This is not limited in the present application.

It should be understood that, in this embodiment of the present invention, descriptions are provided by using an example in which only the MCS table is used to indicate the first correspondence. However, the present application is not limited thereto. Alternatively, a correspondence between the coding method and the index number may be indicated in another manner, and this also falls within the protection scope of the present application.

Optionally, in another embodiment, in S110, the following may be included: At least one of a service channel type or a transmission time interval TTI type is used as the first indication information, where a second correspondence exists between the service channel type and/or TTI type and the coding method that needs to be used for the service channel over which the to-be-transmitted data is transmitted.

In this embodiment of the present invention, the second correspondence may be preconfigured on the base station and the terminal device. In this way, after S120, the terminal device may determine, according to the second correspondence, the coding method indicated by the first indication information.

The TTI type may be classified according to a TTI length, and the service channel type may be classified according to a service function, a service scenario, or the like. When the service channel type is classified according to the service function, the service channel type may be a video service channel, a voice service channel, a short message service channel, a picture service channel, or the like. When the service channel type is classified according to the service scenario, the service channel type may be a unicast service channel, a multicast service channel, a broadcast service channel, or the like.

For example, the service channel type may be used as the first indication information. The second correspondence between the service channel type and the coding method may be shown in Table 3.

TABLE 3

| Service channel type | Coding method |
|---|---|
| Y1 | C1 |
| Y2 | C2 |
| Y3 | C3 |

In this case, the base station determines the required service channel type for the to-be-transmitted data, and uses the service channel type as the first indication information. The second correspondence between the service channel type and the coding method that needs to be used for the service channel over which the to-be-transmitted data is transmitted is shown in Table 3. For example, when the base station determines that a service channel type required for the service channel of the to-be-transmitted data 1 is Y1, the base station may use Y1 as the first indication information, and this indicates that the coding method used for the data 1 is C1. When the base station determines that a service channel type required for the service channel of the to-be-transmitted data 2 is Y3, the base station may use Y3 as the first indication information, and this indicates that the coding method used for the data 2 is C3.

For another example, the TTI type may be used as the first indication information. The second correspondence between the TTI type and the coding method may be shown in Table 4. According to a service requirement, the TTI type in this embodiment of the present invention may be 0.1 ms, 0.5 ms. 1 ms, 2 ms, 1 to 2 ms, or the like.

TABLE 4

| TTI type | Coding method |
|---|---|
| X1 | C1 |
| X2 | C2 |
| X3 | C3 |

In this case, the base station determines the required TTI type for the to-be-transmitted data, and uses the TTI type as the first indication information. The second correspondence between the TTI type and the coding method that needs to be used for the service channel over which the to-be-transmitted data is transmitted is shown in Table 4. For example, when the base station determines that a TTI type required for the service channel of the to-be-transmitted data 1 is X1, the base station may use X1 as the first indication information, and this indicates that the coding method used for the data 1 is C1. When the base station determines that a TTI type required for the service channel of the to-be-transmitted data 2 is X3, the base station may use X3 as the first indication information, and this indicates that the coding method used for the data 2 is C3.

For another example, the service channel type and the TTI type may be combined as the first indication information. The second correspondence between the service channel type and TTI type and the coding method may be shown in Table 5.

TABLE 5

| Service channel type | TTI type | |
| --- | --- | --- |
| | X1 | X2 |
| Y1 | C1 | C3 |
| Y2 | C2 | C4 |

In this case, the base station determines the required service channel type and TTI type for the to-be-transmitted data, and uses the service channel type and TTI type as the first indication information. The second correspondence between the service channel type and TTI type and the coding method that needs to be used for the service channel over which the to-be-transmitted data is transmitted is shown in Table 5. For example, when the base station determines that a service channel type and a TTI type required for the service channel of the to-be-transmitted data 1 is Y1 and X1 respectively, the base station may use a combination of the TTI type X1 and the service channel type Y1 as the first indication information, and this indicates that the coding method used for the data 1 is C1. When the base station determines that a TTI type and a service channel type required for the service channel of the to-be-transmitted data 2 is X2 and Y1 respectively, the base station may use a combination of the TTI type X2 and the service channel type Y1 as the first indication information, and this indicates that the coding method used for the data 2 is C3.

In addition, in this embodiment of the present invention, the first indication information may be further used to indicate a feedback delay type. The feedback delay type is used by the terminal device to determine a subframe for feedback information transmission. A third correspondence exists between the first indication information and the feedback delay type.

In this way, after S120, the terminal device may determine the coding method and the feedback delay type according to the first indication information.

It can be understood that the third correspondence may exist between the coding method and the feedback delay type if the first indication information is the coding method, as shown in Table 6. Correspondingly, after S120, the terminal device may determine the feedback delay type according to the correspondence shown in Table 6.

TABLE 6

| Coding method | Feedback delay type |
| --- | --- |
| C1 | k1 |
| C2 | k2 |
| C3 | k3 |

If the first indication information is an index number, after S120, the terminal device may determine the coding method according to the first correspondence shown in Table 1 or Table 2, and further determine the feedback delay type according to the third correspondence shown in Table 6. If the first indication information is a service channel type, after S120, the terminal device may determine the coding method according to the second correspondence shown in Table 3, and further determine the feedback delay type according to the third correspondence shown in Table 6. If the first indication information is a TTI type, after S120, the terminal device may determine the coding method according to the second correspondence shown in Table 4, and further determine the feedback delay type according to the third correspondence shown in Table 6, if the first indication information is a service channel type and a TTI type, after S120, the terminal device may determine the coding method according to the second correspondence shown in Table 5, and further determine the feedback delay type according to the third correspondence shown in Table 6.

If the first indication information is a service channel type, the third correspondence may exist between the service channel type and the feedback delay type, as shown in Table 7.

TABLE 7

| Service channel type | Feedback delay type |
| --- | --- |
| Y1 | k1 |
| Y2 | k2 |
| Y3 | k3 |

In this case, after determining that the first indication information is the service channel type, the base station may determine, according to Table 7, the feedback delay type corresponding to the service channel type. For example, when the base station determines that the first indication information indicating the coding method for the to-be-transmitted data 1 is a service channel type Y1, the base station may further determine that a feedback delay type is k1. When the base station determines that the first indication information indicating the coding method for the to-be-transmitted data 2 is a service channel type Y3, the base station may further determine that a feedback delay type is k3.

Correspondingly, after S120, the terminal device may determine the coding method according to the second correspondence shown in Table 3, and determine the feedback delay type according to the third correspondence shown in Table 7.

If the first indication information is a TTI type, the third correspondence may exist between the TTI type and the feedback delay type, as shown in Table 8.

TABLE 8

| TTI type | Feedback delay type |
| --- | --- |
| X1 | k1 |
| X2 | k2 |
| X3 | k3 |

In this case, after determining that the first indication information is the TTI type, the base station may determine, according to Table 8, the feedback delay type corresponding to the TTI type. For example, when the base station determines that the first indication information indicating the coding method for the to-be-transmitted data 1 is a TTI type X1, the base station may further determine that a feedback delay type is k1. When the base station determines that the first indication information indicating the coding method for the to-be-transmitted data 2 is a TTI type X3, the base station may further determine that a feedback delay type is k3.

Correspondingly, after S120, the terminal device may determine the coding method according to the second correspondence shown in Table 4, and determine the feedback delay type according to the third correspondence shown in Table 8.

If the first indication information is a service channel type and a TTI type, the third correspondence may exist between the service channel type and TTI type and the feedback delay type, as shown in Table 9.

TABLE 9

| Service channel type | TTI type | |
|---|---|---|
|  | X1 | X2 |
| Y1 | k1 | k3 |
| Y2 | k2 | k4 |

In this case, after determining that the first indication information is a combination of the service channel type and TTI type, the base station may determine, according to Table 9, the feedback delay type corresponding to the combination of the service channel type and type. For example, when the base station determines that the first indication information indicating the coding method for the to-be-transmitted data 1 is a service channel type Y1 and a TTI type X1, the base station may further determine that a feedback delay type is k1. When the base station determines that the first indication information indicating the coding method for the to-be-transmitted data 2 is a service channel type Y1 and a TTI type X2, the base station may further determine that a feedback delay type is k3.

Correspondingly, after S120, the terminal device may determine the coding method according to the second correspondence shown in Table 5, and determine the feedback delay type according to the third correspondence shown in Table 9.

Optionally, in this embodiment of the present invention, the control signaling may further include second indication information. The second indication information is used to indicate a feedback delay type. Before sending the control signaling, the base station determines the second indication information.

Correspondingly, after S120, the terminal device may determine the feedback delay type according to the second indication information.

Optionally, in another embodiment, in S110, the feedback delay type may be used as the first indication information. The correspondence shown in Table 6 exists between the feedback delay type and the coding method.

In this case, after determining, according to a type of the to-be-transmitted data, the coding method that needs to be used for the service channel over which the to-be-transmitted data is transmitted, the base station may determine, according to Table 6, the feedback delay type corresponding to the coding method, and use the feedback delay type as the first indication information. For example, when the base station determines that the coding method that needs to be used for the service channel of the to-be-transmitted data 1 is C1, a feedback delay type k1 may be used as the first indication information.

Figure 2:
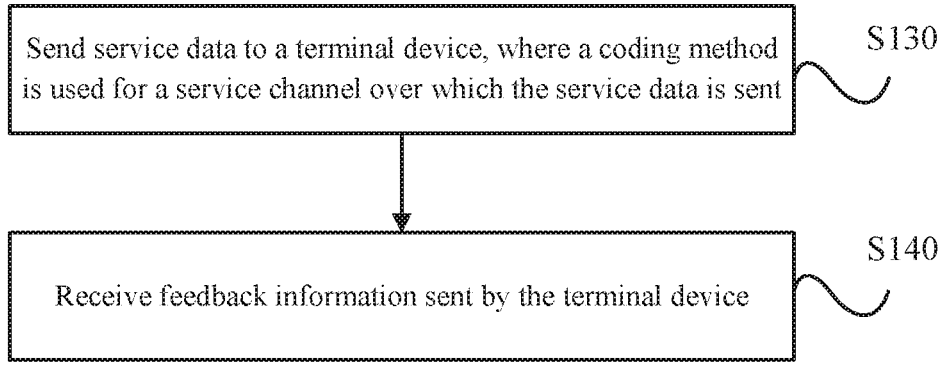
FIG. 2 is another schematic flowchart of a data transmission method according to an embodiment of the present invention.

Optionally, as shown in FIG. 2, the data transmission method 100 in this embodiment of the present invention may further include the following steps.

S130: Send service data to the terminal device, where the coding method is used for the service channel over which the service data is sent.

S140: Receive feedback information sent by the terminal device.

Specifically, when sending the control signaling to the terminal device in step S120, or after step S120, the base station sends the service data to the terminal device. The service data is the to-be-transmitted data in step S110. The coding method indicated by the first indication information is used for the service channel over which the service data is sent. Further, the base station receives the feedback information sent by the terminal device. The feedback information is used by the terminal device to inform the base station whether the service data needs to be sent again.

Optionally, in this embodiment of the present invention, a subframe for transmitting the feedback information is determined by the terminal device according to the feedback delay type.

Optionally, the feedback delay type may be a fixed value. For example, a feedback delay type in an FDD mode may be preset to 4, and a feedback delay type in a TDD mode may be preset to 7.

Currently, a TTI length of a PDSCH for data service transmission in LTE is 1 ms, corresponding to duration of one subframe. After detecting service data transmission over the PDSCH, the terminal device sends an ACK/NACK response to the base station by using a PUCCH. Because of a processing delay at a physical layer or a media access control layer (MAC for short) in LTE, for example, when a coding and modulation scheme for the PDSCH is Turbo coding, because of a relatively long decoding delay required for iterative decoding of a Turbo code, there is a feedback delay k for a time at which the terminal device sends the ACK/NACK response. The feedback delay k may be calculated by using a subframe as a unit. That is, there is a type of HARQ timing in LTE; when the terminal device detects PDSCH transmission in the $(n-k)^{th}$ subframe, the terminal device sends, to the base station in the $n^{th}$ subframe, an ACK/NACK response corresponding to the PDSCH transmission.

In a current LTE system, the feedback delay k is a fixed value of 4 in the frequency division duplex (FDD for short) mode. In the time division duplex (TDD for short) mode, an ACK/NACK response corresponding to PDSCH transmission in each downlink subframe (n−k) in any one of multiple uplink-downlink configurations is sent in the $n^{th}$ subframe, and the feedback delay k is also a fixed value.

In this embodiment of the present invention, for a future 5G communications system, there are low, medium, and high delay types for different scenarios or services, and the feedback delay k may change flexibly according to a service or scenario requirement. Therefore, the base station may determine the feedback delay type, and the terminal device determines, according to the feedback delay type, the subframe for transmitting the feedback information. This can satisfy requirements of low, medium, and high delay types for different scenarios or services in future 5G communications.

Optionally, the feedback delay type may also be determined by the terminal device according to the first indication information sent by the base station.

Optionally, if the control signaling includes the second indication information, the feedback delay type may be determined by the terminal device according to the second indication information sent by the base station.

Specifically, after step S120, the terminal device may determine the feedback delay type. Correspondingly, after S130, the terminal device determines, according to the feedback delay type, the subframe for transmitting the feedback information. After detecting data transmission over the service channel, the terminal device may send the feedback information to the base station in the determined subframe. The feedback information may be an ACK/NACK response.

Optionally, the feedback delay type may be a quantity of subframes in an interval between a subframe for service data transmission and a subframe for feedback information transmission.

For example, after the terminal device determines that the feedback delay type is k, when detecting service channel transmission in the $(n-k)^{th}$ subframe, the terminal device sends, to the base station in the $n^{th}$ subframe, feedback information corresponding to the service channel transmission. For a frequency division duplex FDD communications system, the terminal device sends the feedback information by using the foregoing method. For a time division duplex TDD communications system, the terminal device needs to send, to the base station in an uplink transmission time of the $n^{th}$ subframe, the feedback information corresponding to the service channel transmission. The $n^{th}$ subframe needs to be an uplink subframe or include an uplink transmission time.

Optionally, in this embodiment of the present invention, for a communications system in time division multiplexing TDD mode, the quantity of subframes in the interval may be 0, that is, k=0 is set, when one subframe corresponds to one TTI length and the subframe includes a downlink transmission time and an uplink transmission time.

Figure 3:
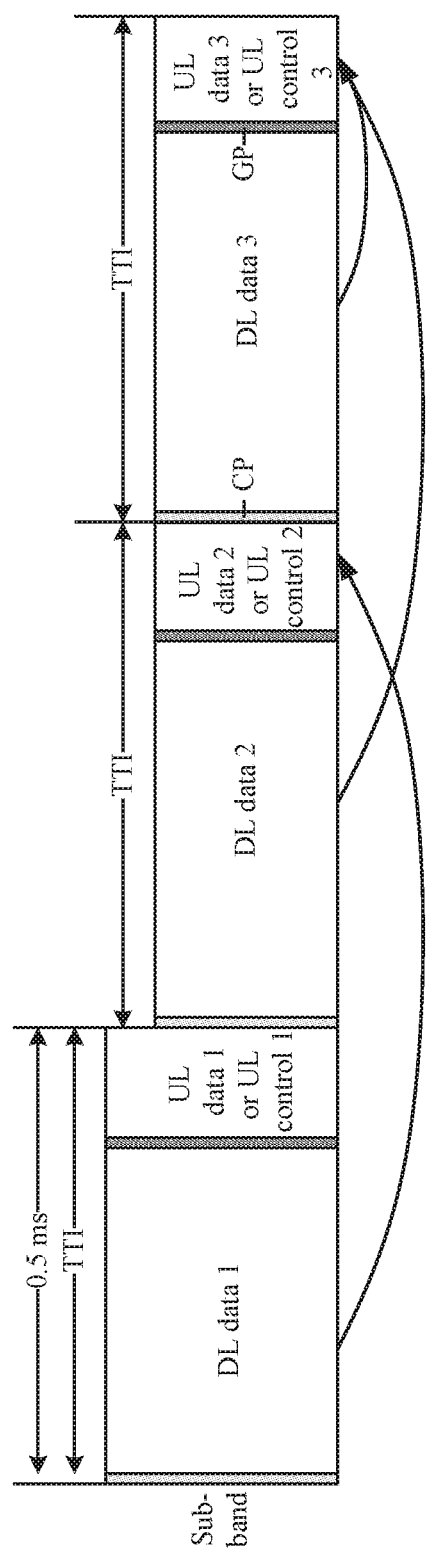
FIG. 3 is a schematic diagram of a subframe for feedback information transmission in a specific embodiment of a data transmission method according to an embodiment of the present invention.
Figure 4:
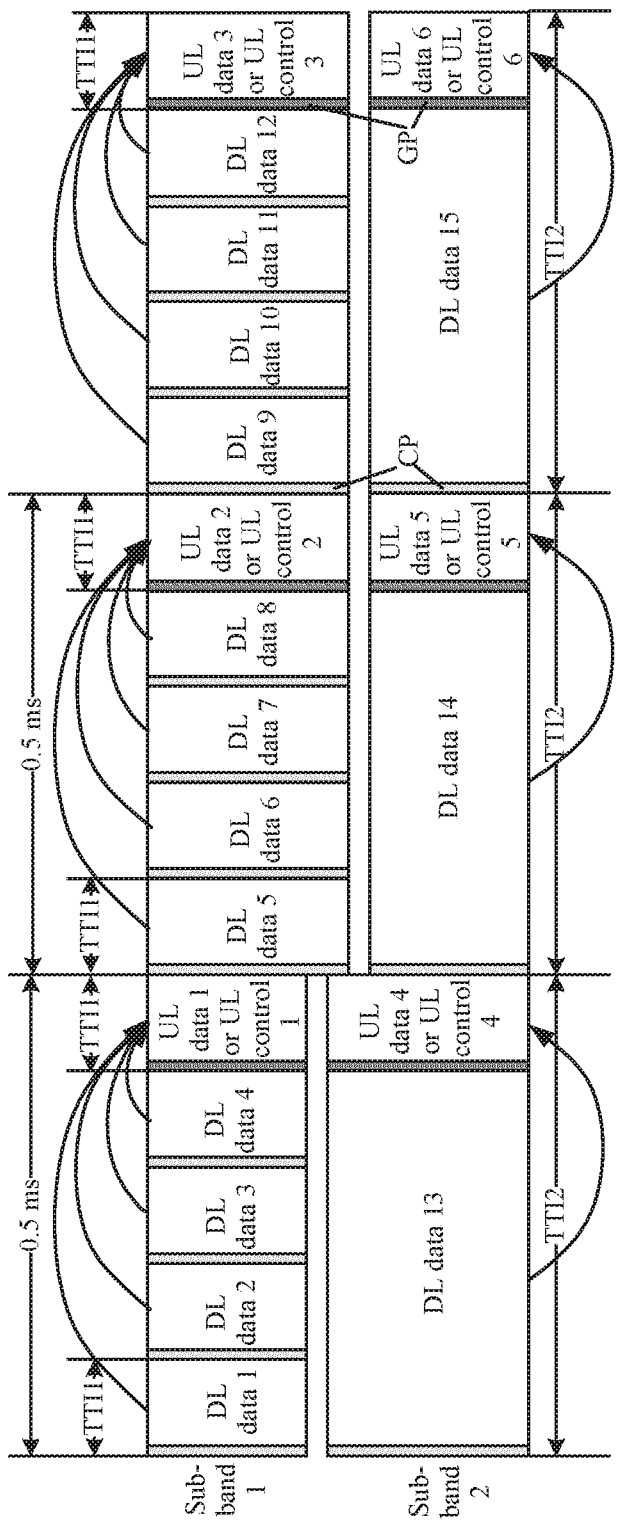
FIG. 4 is a schematic diagram of a subframe for feedback information transmission in another specific embodiment of a data transmission method according to an embodiment of the present invention.
Figure 5:
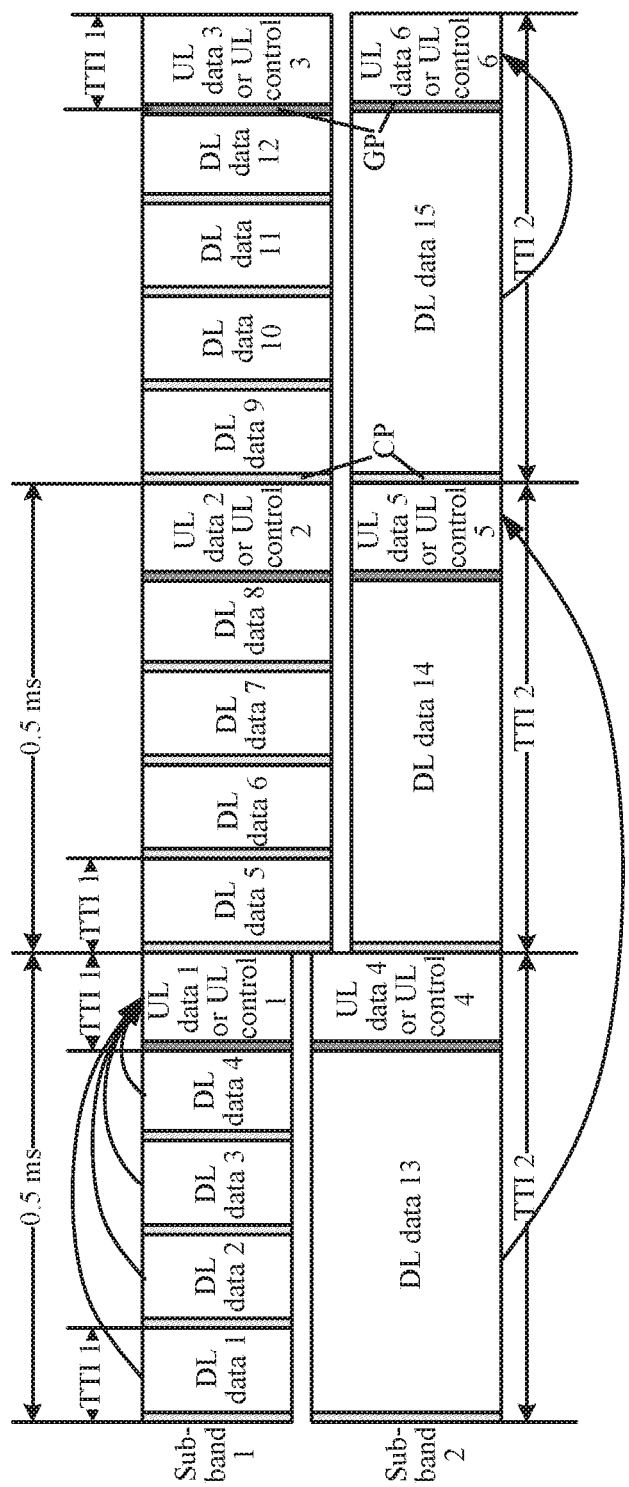
FIG. 5 is a schematic diagram of a subframe for feedback information transmission in another specific embodiment of a data transmission method according to an embodiment of the present invention.

With reference to FIG. 3 to FIG. 5, the following uses an example in which the service data is downlink data, to describe in detail the subframe that is determined by the terminal device and that is used for feedback information transmission. As shown in FIG. 3 to FIG. 5, a shaded area between uplink transmission data or uplink control information and downlink transmission data is a guard period (GP for short). A shaded area between adjacent downlink transmission data is a CP. Feedback information is sent in an uplink transmission time. The feedback information may be separately sent, or may be sent simultaneously with uplink data or uplink control information.

For example, the service channel type may be used as the first indication information to indicate the feedback delay type according to the third correspondence in Table 7. With reference to FIG. 3, the following describes in detail the subframe that is determined by the terminal device and that is used for feedback information transmission.

In this embodiment of the present invention, a TTI length of a service channel or a TTI length of a sub-band corresponding to the service channel corresponds to duration of one subframe. DL data 1 is transmitted in a downlink transmission time of the first subframe in the sub-band, DL data 2 is transmitted in a downlink transmission time of the second subframe in the sub-band, and DL data 3 is transmitted in a downlink transmission time of the third subframe in the sub-band. The three types of data correspond to three service channel types Y1, Y2, and Y3 respectively. Values of corresponding feedback delays k1, k2, and k3 are 1, 1, and 0 respectively.

After S130, the terminal device determines the subframe for feedback information transmission according to the feedback delay type, that is, determines to send feedback information of the DL data 1 in an uplink transmission time of the second subframe, send feedback information of the DL data 2 in an uplink transmission time of the third subframe, and send feedback information of the DL data 3 in the uplink transmission time of the third subframe.

It can be understood that a bandwidth of Y1 is greater than those of Y2 and Y3. Correspondingly, a data volume of the DL data 1 transmitted over Y1 is greater, for example, a video service. A data volume of the DL data 2 transmitted over Y2 and a data volume of the DL data 3 transmitted over Y3 are smaller, for example, a short message service.

Therefore, compared with Y2 and Y3, Y1 may be a service channel type with a high delay type. In addition, a delay for the DL data 2 is greater than a delay for the DL data 3 because a low delay type is not required for a data service or scenario of the DL data 2 while a low delay type is required for a data service or scenario of the DL data 3.

For another example, the TTI type may be used as the first indication information to indicate the feedback delay type according to the third correspondence in Table 8. With reference to FIG. 4, the following describes in detail the subframe that is determined by the terminal device and that is used for feedback information transmission.

In FIG. 4, TTI types X1 and X2 are 0.1 ms and 0.5 ms respectively, and corresponding feedback delay types k1 and k2 are 4 and 0 respectively.

A TTI type in a sub-band 1 is X1, and one TTI length corresponding to one subframe in one sub-band includes only an uplink transmission time or a downlink transmission time. k≤k1 is set to indicate that a value of a feedback delay k is less than or equal to 4. For example, for DL data 1 transmitted in the first subframe, a feedback delay k=4; for DL data 2 transmitted in the second subframe, a feedback delay k=3; for DL data 3 transmitted in the third subframe, a feedback delay k=2; for DL data 4 transmitted in the fourth subframe, a feedback delay k=1.

After S130, the terminal device determines the subframe for feedback information transmission according to the feedback delay type. When the terminal device detects that the DL data 1, the DL data 2, the DL data 3, and the DL data 4 are transmitted over a service channel, the terminal device sends feedback information corresponding to the DL data 1, DL data 2, DL data 3, and DL data 4 to the base station in the fifth subframe. The fifth subframe is an uplink subframe.

A TTI type in a sub-band 2 is X2, and one TTI length corresponding to one subframe includes an uplink transmission time and a downlink transmission time. k=k2=0 is set. After S130, the terminal device determines the subframe for feedback information transmission according to the feedback delay type. For example, when receiving DL data 13 transmitted in the first subframe, the terminal device sends feedback information corresponding to the DL data 13 to the base station in the uplink transmission time of the first subframe.

For another example, a combination of the TTI type and the service channel may be used as the first indication information to indicate the feedback delay type according to the third correspondence in Table 9. With reference to FIG. 5, the following describes in detail the subframe that is determined by the terminal device and that is used for feedback information transmission.

In FIG. 5, a TTI length X1 in a sub-band 1 is 0.1 ms, and a TTI length X2 in a sub-band 2 is 0.5 ms. The following provides descriptions by using DL data 1, DL data 2, DL data 3, and DL data 4 that are transmitted in the sub-band 1 and DL data 13 and DL data 15 that are transmitted in the sub-band 2 as an example.

A TTI type in the sub-band 1 is X1. Types of service channels over which the DL data 1, the DL data 2, the DL data 3, and the DL data 4 are transmitted are Y1, Y2, Y3, and Y4 respectively. Y1 and Y4 may correspond to different service types, for example, a video service, a voice service, a picture service, and a short message service. A combination of X1 and Y1 corresponds to a feedback delay type k1=4. A combination of X1 and Y2 corresponds to a feedback delay type k2=3. A combination of X1 and Y3 corresponds to a feedback delay type k3=2. A combination of X1 and Y4 corresponds to a feedback delay type k4=1. A TTI type in the sub-band 2 is X2. Types of service channels over which the DL data 13 and the DL data 15 are transmitted are Y5 and Y7 respectively, for example, a video service and a voice service. A combination of X2 and Y5 corresponds to a feedback delay type k5=1. A combination of X2 and Y7 corresponds to a feedback delay type k7=0.

Correspondingly, after S130, the terminal device determines the subframe for feedback information transmission according to the feedback delay type, that is, determines to send, in the fifth subframe in the sub-band 1, feedback information of the DL data 1, DL data 2, DL data 3, and DL data 4 that are transmitted in the sub-band 1, send, in an uplink transmission time of the second subframe in the sub-band 2, feedback information of the DL data 13 transmitted in the sub-band 2, and send, in an uplink transmission time of the third subframe in the sub-band 2, feedback information of the DL data 15 transmitted in the sub-band 2.

It should be understood that, in order to make a future 5G communications system satisfy multiple important requirements, such as a super-high transmission rate, a large quantity of connections, and high spectral efficiency, both a TTI length and a service channel type in a sub-band may change flexibly according to a service or scenario requirement.

Optionally, in this embodiment of the present invention, the control signaling may be scheduling signaling.

Specifically, the base station may send, by using the control signaling, the first indication information to the terminal device, or the first indication information and the second indication information to the terminal device. In addition, the control information may be a type of scheduling signaling. The scheduling signaling is used to schedule a service channel in one of sub-bands of entire system bandwidth to use the coding method to transmit the to-be-transmitted data.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

Optionally, in this embodiment of the present invention, the terminal device may further generate indication information indicating a coding method that needs to be used for a service channel over which to-be-transmitted data is transmitted, and send, to the base station or another terminal device, control signaling that includes the indication information. The to-be-transmitted data may be uplink data to be sent to the base station or device-to-device (D2D for short) data to be sent to the another terminal device. Specifically, a characteristic and function of the indication information is the same as those of the first indication information in FIG. 1. For brevity, details are not described herein again.

Further, the terminal device may further send service data to the base station or another terminal device, and the base station or the another terminal device that receives the data may send feedback information to the terminal device. Specifically, a characteristic and function of the sent feedback information is the same as those of the feedback information in FIG. 2 to FIG. 5. For brevity, details are not described herein again.

Figure 6:
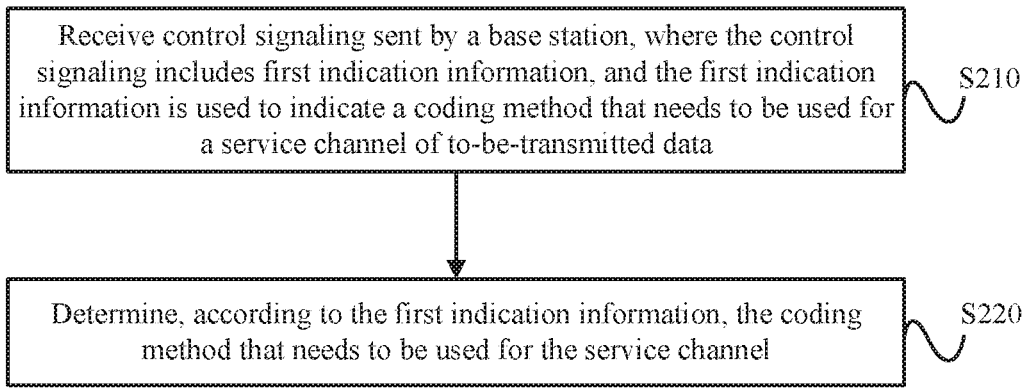
FIG. 6 is a schematic flowchart of a data transmission method according to another embodiment of the present invention.
Figure 7:
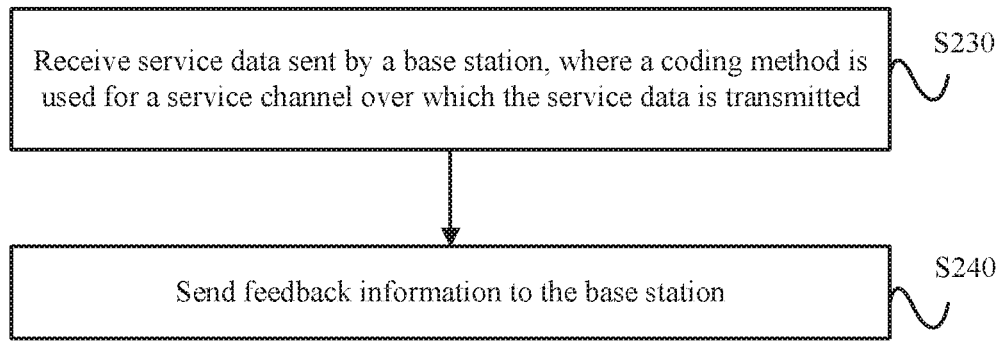
FIG. 7 is another schematic flowchart of a data transmission method according to another embodiment of the present invention.

The following describes another data transmission method 200 in an embodiment of the present invention with reference to FIG. 6 and FIG. 7. As shown in FIG. 6, the data transmission method 200 according to this embodiment of the present invention may be, for example, executed by a terminal device in a communications system. The terminal device may be user equipment. As shown in FIG. 6, the method 200 includes the following steps.

S210: Receive control signaling sent by a base station, where the control signaling includes first indication information, and the first indication information is used to indicate a coding method that needs to be used for a service channel of to-be-transmitted data.

S220: Determine, according to the first indication information, the coding method that needs to be used for the service channel.

Specifically, after receiving the control signaling sent by the base station, the terminal device obtains the first indication information included in the control signaling, and obtains, according to the indication information, the coding method used for the service channel over which the base station needs to send data. The terminal device may receive, according to the coding method, the data sent by the base station.

Therefore, in this embodiment of the present invention, the terminal device can determine coding methods for different to-be-transmitted data according to the first indication information sent by the base station, and further, can receive different to-be-transmitted data sent by the base station. This is applicable to different scenarios, and can thereby improve flexibility in use.

Optionally, as shown in FIG. 7, the method 200 may further include the following steps.

S230: Receive service data sent by the base station, where the coding method is used for the service channel over which the service data is transmitted.

S240: Send feedback information to the base station.

Optionally, before the sending feedback information to the base station, the method 200 further includes determining, according to the first indication information, a subframe for transmitting the feedback information.

Optionally, the sending feedback information to the base station may be specifically sending the feedback information to the base station in the subframe.

Optionally, the first indication information may be an index number, and a first correspondence exists between the index number and the coding method.

Optionally, the first correspondence may be indicated as a modulation and coding scheme MCS table, and the MCS table includes the index number and the coding method corresponding to the index number.

Optionally, the MCS table further includes a modulation order corresponding to the index number.

Optionally, the first indication information may be a service channel type and/or a transmission time interval TTI type, and a second correspondence exists between the service channel type and/or the TTI type and the coding method.

Optionally, the first indication information may be a feedback delay type, and a correspondence exists between the feedback delay type and the coding method.

Optionally, the first indication information may be further used to indicate a feedback delay type, and a third correspondence exists between the first indication information and the feedback delay type. The determining, according to the first indication information, a subframe for transmitting the feedback information may be specifically determining, according to the feedback delay type, the subframe for transmitting the feedback information.

Optionally, the control signaling may further include second indication information. The second indication information is used to indicate a feedback delay type of the feedback information. Before the sending feedback information to the base station, the method 200 may further include determining, according to the second indication information, a subframe for transmitting the feedback information. The sending feedback information to the base station may be specifically sending the feedback information to the base station in the subframe.

Optionally, the feedback delay type is a quantity of subframes in an interval between a subframe for service data transmission and a subframe for feedback information transmission.

Optionally, for a communications system in time division multiplexing TDD mode, the quantity of subframes in the interval is 0 when one subframe corresponds to one TTI length and the one subframe includes a downlink transmission time and an uplink transmission time.

Optionally, in the data transmission method 200 in this embodiment of the present invention, the control signaling is scheduling signaling.

Optionally, the coding method includes at least one of polar coding, rateless Rateless coding, Turbo coding, low-density parity-check coding LDPC coding, convolutional coding, or the like.

It should be understood that interaction between a network device and a terminal device described from a network device side, and related characteristics, functions, and the like of the network device and the terminal device correspond to those described from a terminal device side. For brevity, details are not described herein again.

It should be further understood that, in the embodiments of the present invention, sequence numbers of the foregoing processes do not indicate an execution sequence. The execution sequence of the processes should be determined according to functions and internal logic of the processes, but should not constitute any limitation on implementation processes of the embodiments of the present invention.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

Figure 8:
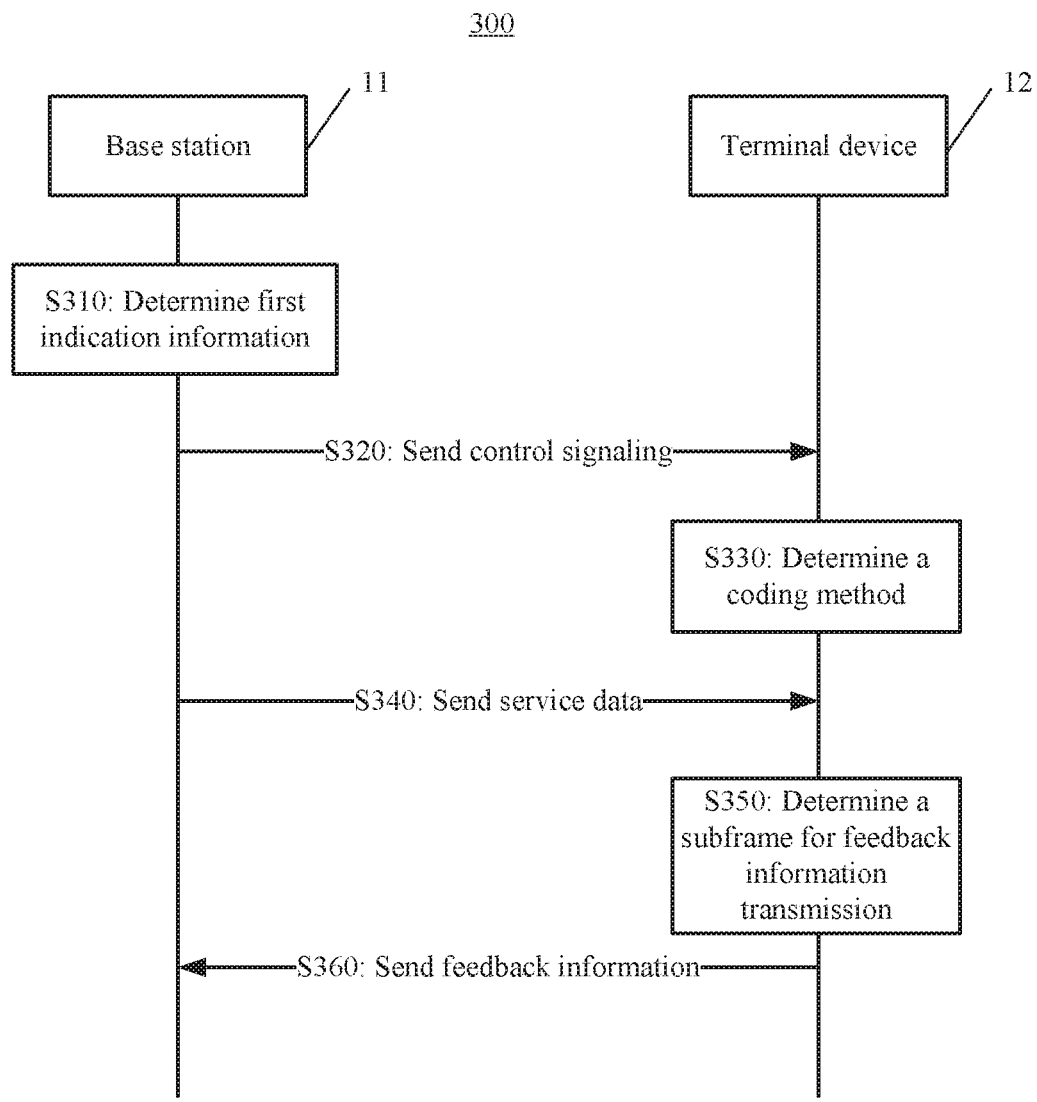
FIG. 8 is an interaction flowchart of another specific embodiment of a data transmission method according to an embodiment of the present invention.

The following describes a specific embodiment of a data transmission method 300 according to an embodiment of the present invention with reference to FIG. 8. As shown in FIG. 8, a base station 11 and a terminal device 12 are included. The method 300 includes the following steps.

S310: The base station 11 determines first indication information, where the first indication information is used to indicate a coding method that needs to be used for a service channel of to-be-transmitted data.

For example, the first indication information may be the coding method, an index number corresponding to the coding method, a service channel type corresponding to the coding method, a TTI type corresponding to the coding method, a combination of a service channel type and a TTI type that correspond to the coding method, or a feedback delay type corresponding to the coding method. This is not limited in the present application.

Optionally, for example, the first indication information may be further used to indicate a feedback delay type, and the feedback delay type is used by the terminal device to determine a subframe for feedback information transmission. In this case, the first indication information may be the coding method, an index number corresponding to the coding method, a service channel type corresponding to the coding method, a TTI type corresponding to the coding method, a combination of a service channel type and a TTI type that correspond to the coding method, or the like. This is not limited in the present application.

Alternatively, optionally, for another example, the base station 11 may further generate second indication information, where the second indication information is used to indicate a feedback delay type.

Specifically, for S310, refer to descriptions about S110 in the foregoing embodiment in FIG. 1. To avoid repetition, details are not described herein again.

S320: The base station 11 sends control signaling to the terminal device 12, where the control signaling includes the first indication information.

Optionally, the control signaling may further include the second indication information.

Specifically, for S320, refer to descriptions about S120 in the foregoing embodiment in FIG. 1. To avoid repetition, details are not described herein again.

S330: The terminal device 12 determines, according to the first indication information, the coding method that needs to be used for the service channel.

Optionally, for example, the terminal device 12 may further determine the feedback delay type according to the first indication information.

Alternatively, for another example, if the control signaling includes the second indication information, the terminal device 12 may determine the feedback delay type according to the second indication information.

Specifically, for S330, refer to descriptions about S220 in the foregoing embodiment in FIG. 6. To avoid repetition, details are not described herein again.

S340: The base station 11 sends service data to the terminal device 12, where the coding method is used for the service channel over which the service data is sent.

It can be understood that the service data in S340 is the to-be-transmitted data in S310.

Specifically, for S340, refer to descriptions about S130 in the foregoing embodiment in FIG. 2. To avoid repetition, details are not described herein again.

It should be noted that, in this embodiment of the present invention, alternatively, S340 may be performed before S320 or be performed simultaneously with S320. This is not limited in the present application.

S350: The terminal device 12 determines a subframe for transmitting feedback information.

Specifically, the terminal device 12 may determine, according to a subframe in which the service data is received in S340 and the feedback delay type, the subframe for transmitting the feedback information.

For example, it is assumed that the service data is received in the $(n-k)^{th}$ subframe and the feedback delay type is k. In this case, the subframe for transmitting the feedback information may be determined as the $n^{th}$ subframe.

Optionally, the feedback delay type may be a fixed value. For example, a feedback delay type in an FDD mode may be preset to 4, and a feedback delay type in a TDD mode may be preset to 7.

Optionally, the feedback delay type may also be determined by the terminal device 12 according to the first indication information sent by the base station.

Optionally, if the control signaling in S320 includes the second indication information, the feedback delay type may be determined by the terminal device 12 according to the second indication information sent by the base station.

Specifically, for S350, refer to descriptions in the foregoing embodiments in FIG. 3 to FIG. 5. To avoid repetition, details are not described herein again.

S360: The terminal device 12 sends the feedback information to the base station 11 in the determined subframe for transmitting the feedback information.

The feedback information is an ACK/NACK response.

Specifically, for S360, refer to descriptions about S140 in the foregoing embodiment in FIG. 2. To avoid repetition, details are not described herein again.

It should be understood that, in the embodiments of the present invention, sequence numbers of the foregoing processes do not indicate an execution sequence. The execution sequence of the processes should be determined according to functions and internal logic of the processes, but should not constitute any limitation on implementation processes of the embodiments of the present invention.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

Figure 9:
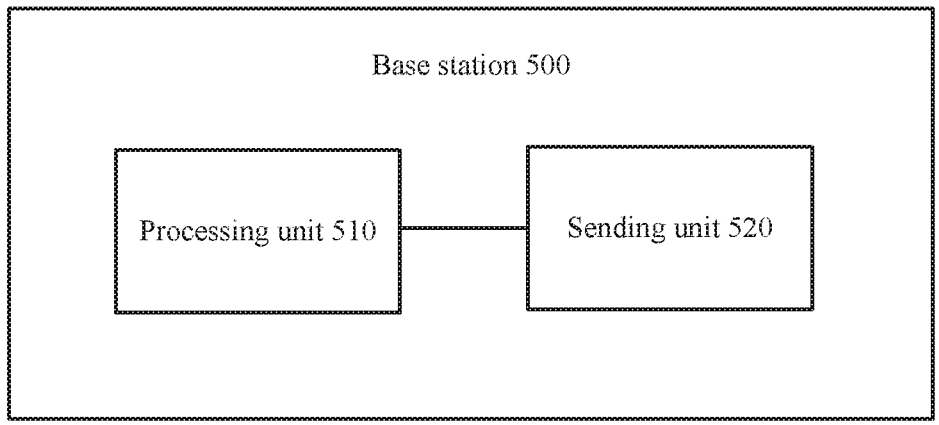
FIG. 9 is a block diagram of a base station for data transmission according to an embodiment of the present invention.

The following describes a base station for data transmission according to an embodiment of the present invention with reference to FIG. 9. Technical features described in the method embodiments may be applicable to the following apparatus embodiment, FIG. 9 shows the base station 500 for data transmission according to this embodiment of the present invention. As shown in FIG. 9, the base station 500 includes:

a processing unit 510, configured to determine first indication information, where the first indication information is used to indicate a coding method that needs to be used for a service channel of to-be-transmitted data; and a sending unit 520, configured to send control signaling to a terminal device, where the control signaling includes the first indication information.

Specifically, the base station determines the first indication information, where the first indication information is used to indicate the coding method that needs to be used for the service channel over which the to-be-transmitted data is transmitted. Then, the base station sends the first indication information to the terminal device by sending the control signaling to the terminal device. In this way, the terminal device can determine, according to the first indication information, the coding method that needs to be used for the service channel over which the to-be-transmitted data is transmitted. Further, the terminal device may receive, according to the coding method, the data sent by the base station.

Therefore, in this embodiment of the present invention, the base station may determine different coding methods for different to-be-transmitted data. This is applicable to different scenarios, and can thereby improve flexibility in use.

Optionally, the processing unit 510 is specifically configured to use an index number as the first indication information. A first correspondence exists between the index number and the coding method.

Optionally, the first correspondence is indicated as a modulation and coding scheme MCS table, and the MCS table includes the index number and the coding method corresponding to the index number.

Optionally, the MCS table further includes a modulation order corresponding to the index number.

Optionally, the processing unit 510 is specifically further configured to use a service channel type and/or a transmission time interval TTI type as the first indication information. A second correspondence exists between the service channel type and/or transmission time interval TTI type and the coding method.

Optionally, the processing unit 510 is specifically further configured to use a feedback delay type as the first indication information. A correspondence exists between the feedback delay type and the coding method.

Optionally, the first indication information determined by the processing unit 510 is specifically further used to indicate a feedback delay type. A third correspondence exists between the first indication information and the feedback delay type.

Optionally, the control signaling sent by the sending unit 520 may further include second indication information. The second indication information is used to indicate a feedback delay type.

Specifically, before the sending unit 520 sends the control information to the terminal device, the processing unit 510 is further configured to determine the second indication information.

Optionally, the feedback delay type is a quantity of subframes in an interval between a subframe for service data transmission and a subframe for feedback information transmission.

Optionally, for a communications system in time division multiplexing TDD mode, the quantity of subframes in the interval is 0 when one subframe corresponds to one TTI length and the one subframe includes a downlink transmission time and an uplink transmission time.

Optionally, the sending unit 520 is further configured to send service data to the terminal device. The coding method is used for the service channel over which the service data is sent. In this case, the base station 500 further includes a receiving unit 530. The receiving unit 530 is configured to receive feedback information sent by the terminal device.

Optionally, a subframe for transmitting the feedback information is determined by the terminal device according to the feedback delay type.

Optionally, for the base station 500 for data transmission in this embodiment of the present invention, the control signaling sent by the sending unit 520 may be scheduling signaling.

Optionally, the coding method includes at least one of polar coding, rateless Rateless coding, Turbo coding, low-density parity-check coding LDPC coding, convolutional coding, or the like.

It should be noted that, in this embodiment of the present invention, the processing unit 510 may be a processor, the sending unit 520 may be a transmitter, and the receiving unit 530 may be a receiver.

It should be understood that the base station 500 for data transmission according to this embodiment of the present invention may correspond to the base station in the method embodiments of the present invention. In addition, the foregoing and other operations and/or functions of modules in the base station 500 are intended to implement corresponding processes of the methods 100 in FIG. 1 to FIG. 5. For brevity, details are not described herein again.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

Figure 10:
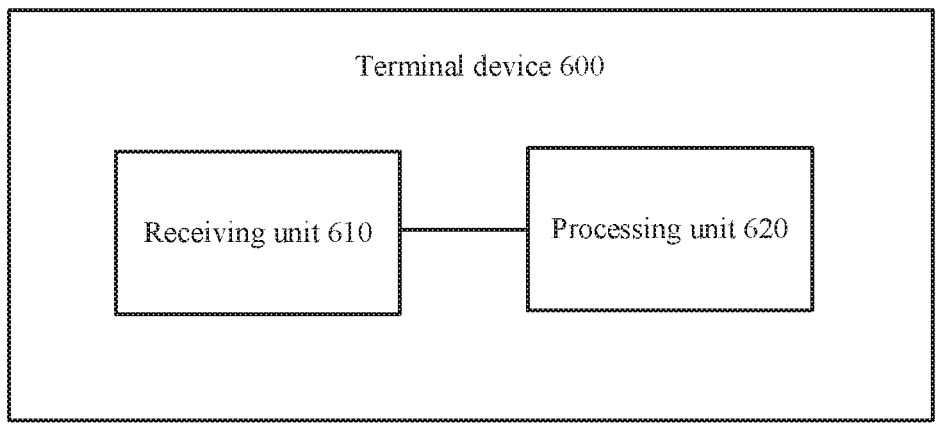
FIG. 10 is a block diagram of a terminal device for data transmission according to an embodiment of the present invention.

The following describes a terminal device for data transmission according to an embodiment of the present invention with reference to FIG. 10. Technical features described in the method embodiments may be applicable to the following apparatus embodiment.

FIG. 10 shows the terminal device 600 for data transmission according to this embodiment of the present invention. As shown in FIG. 10, the terminal device 600 includes:

a receiving unit 610, configured to receive control signaling sent by a base station, where the control signaling includes first indication information, and the first indication information is used to indicate a coding method that needs to be used for a service of to-be-transmitted data; and a processing unit 620, configured to determine, according to the first indication information, the coding method that needs to be used for the service channel.

Specifically, after receiving the control signaling sent by the base station, the terminal device obtains the first indication information included in the control signaling, and obtains, according to the indication information, the coding method used for the service channel over which the base station needs to send data. The terminal device may receive, according to the coding method, the data sent by the base station.

Therefore, in this embodiment of the present invention, the terminal device can determine coding methods for different to-be-transmitted data according to the first indication information sent by the base station, and further, can receive different to-be-transmitted data sent by the base station. This is applicable to different scenarios, and can thereby improve flexibility in use.

Optionally, the receiving unit 610 is further configured to receive service data sent by the base station. The coding method is used for the service channel over which the service data is transmitted. In this case, the terminal device 600 further includes a sending unit 630. The sending unit 630 is configured to send feedback information to the base station.

Optionally, before the sending unit 630 sends the feedback information to the base station, the processing unit is further configured to determine, according to the first indication information included in the control information received by the receiving unit 610, a subframe for transmitting the feedback information. The sending unit 630 is specifically further configured to send the feedback information to the base station in the subframe.

Optionally, the first indication information may be an index number, and a first correspondence exists between the index number and the coding method.

Optionally, the first correspondence may be indicated as an MCS table, and the MCS table further includes a modulation order corresponding to the index number.

Optionally, the first indication information may alternatively be a service channel type and/or a transmission time interval TTI type, and a second correspondence exists between the service channel type and/or TTI type and the coding method.

Optionally, the first indication information may alternatively be a delay type, and a correspondence exists between the delay type and the coding method.

Optionally, the first indication information is further used to indicate a feedback delay type, and a third correspondence exists between the first indication information and the feedback delay type. The processing unit 620 is specifically further configured to determine, according to the feedback delay type, the subframe for transmitting the feedback information.

Optionally, the control signaling received by the receiving unit 610 further includes second indication information. The second indication information is used to indicate a feedback delay type of the feedback information. Before the sending unit 630 sends the feedback information to the base station, the processing unit 620 is specifically further configured to determine, according to the second indication information, a subframe for transmitting the feedback information. The sending unit 630 is specifically further configured to send the feedback information to the base station in the subframe determined by the processing unit 620.

Optionally, the feedback delay type is a quantity of subframes in an interval between a subframe for service data transmission and a subframe for feedback information transmission.

Optionally, for a communications system in time division multiplexing TDD mode, the quantity of subframes in the interval is 0 when one subframe corresponds to one TTI length and the one subframe includes a downlink transmission time and an uplink transmission time.

Optionally, the control signaling received by the receiving unit 610 is scheduling signaling.

Optionally, the coding method includes at least one of polar coding, rateless Rateless coding, Turbo coding, low-density parity-check coding LDPC coding, convolutional coding, or the like.

It should be noted that, in this embodiment of the present invention, the receiving unit 610 may be a receiver, the processing unit 620 may be a processor, and the sending unit 630 may be a transmitter.

It should be understood that the terminal device 600 for data transmission according to this embodiment of the present invention may correspond to the terminal device in the method embodiments of the present invention. In addition, the foregoing and other operations and/or functions of modules in the terminal device 600 are intended to implement corresponding processes of the methods 200 in FIG. 6 and FIG. 7. For brevity, details are not described herein again.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

Figure 11:
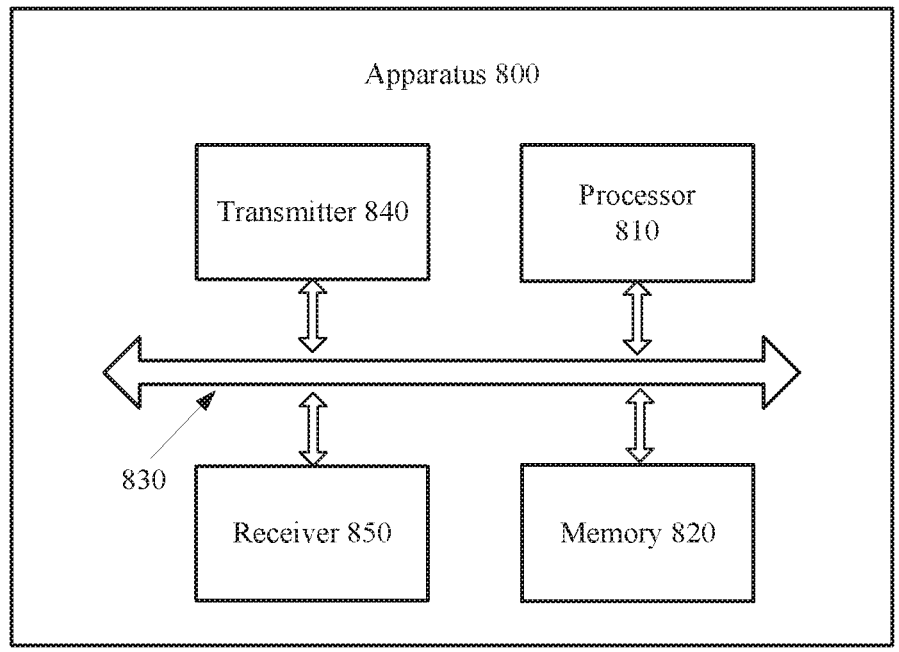
FIG. 11 is a block diagram of a base station for data transmission according to another embodiment of the present invention.

As shown in FIG. 11, an embodiment of the present invention further provides an apparatus 800 for data transmission. The apparatus includes a processor 810, a memory 820, a bus system 830, and a transmitter 840. The processor 810, the memory 820, and the transmitter 840 are connected by using the bus system 830. The memory 820 is configured to store an instruction. The processor 810 is configured to execute the instruction stored in the memory 820, to control the transmitter 840 to send a signal.

The processor 810 is configured to determine first indication information, where the first indication information is used to indicate a coding method that needs to be used for a service channel of to-be-transmitted data.

The transmitter 840 is configured to send control signaling to a terminal device, where the control signaling includes the first indication information.

Specifically, the apparatus for data transmission in this embodiment of the present invention determines the first indication information, where the first indication information is used to indicate the coding method that needs to be used for the service channel over which the to-be-transmitted data is transmitted. Then, the apparatus sends the first indication information to the terminal device by sending the control signaling to the terminal device. In this way, the terminal device can determine, according to the first indication information, the coding method that needs to be used for the service channel over which the to-be-transmitted data is transmitted. Further, the terminal device may receive, according to the coding method, the data sent by the base station.

Therefore, in this embodiment of the present invention, the base station may determine different coding methods for different to-be-transmitted data. This is applicable to different scenarios, and can thereby improve flexibility in use.

It should be noted that the foregoing method embodiments of the present invention may be applied to a processor or be implemented by a processor. The processor may be an integrated circuit chip and has a signal processing capability. In an implementation process, steps in the foregoing method embodiments may be completed by using an integrated logic circuit of hardware in the processor or by using an instruction in a form of software. The foregoing processor may be a general purpose processor, a digital signal processor (DSP for short), an application-specific integrated circuit (ASIC for short), a field programmable gate array (FPGA for short) or another programmable logic device, a discrete gate or a transistor logic device, or a discrete hardware component, and can implement or execute the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be directly executed by a hardware decoding processor, or may be executed by using a combination of hardware in a decoding processor and a software module. The software module may be located in a storage medium that is mature in the art, such as a random access memory, a flash memory, a read-only memory, a programmable read-only memory, an electrically erasable programmable memory, or a register. The storage medium is located in a memory. The processor reads information in the memory, and completes the steps of the foregoing methods in combination with the hardware of the processor.

It can be understood that the memory in this embodiment of the present invention may be a volatile memory or a nonvolatile memory, or may include both a volatile memory and a nonvolatile memory. The nonvolatile memory may be a read-only memory (ROM for short), a programmable ROM (PROM for short), an erasable programmable read only memory (EPROM for short), an electrically erasable programmable read-only memory (EEPROM for short), or a flash memory. The volatile memory may be a random access memory (RAM for short) and is configured as an external cache. By means of illustrative rather than limitative description, multiple forms of RAMs are available, for example, a static random access memory (SRAM for short), a dynamic random access memory (DRAM for short), a synchronous dynamic random access memory (SDRAM for short), a double data rate synchronous dynamic random access memory (DDR SDRAM for short), an enhanced synchronous dynamic random access memory (ESDRAM for short), a synchlink DRAM (SLDRAM for short), and a direct rambus random access memory (DR RAM for short). It should be noted that a memory in a system and the method that are described in this specification is intended to include but is not limited to these memories and any other appropriate types of memories.

In addition to a data bus, the bus system 830 may further include a power bus, a control bus, a status signal bus, and the like. However, for clear description, various buses in the figure are all marked as the bus system 830.

In an implementation process, the steps of the foregoing methods may be completed by using an integrated logic circuit of hardware in the processor 810 or by using an instruction in a form of software. The steps of the methods disclosed with reference to the embodiments of the present invention may be directly executed by a hardware processor, or may be executed by a combination of hardware in a processor and a software module. The software module may be located in a storage medium that is mature in the art, such as a random access memory, a flash memory, a read-only memory, a programmable read-only memory, an electrically erasable programmable memory, or a register. The storage medium is located in the memory 820. The processor 810 reads information in the memory 820, and completes the steps in the foregoing methods in combination with hardware of the processor 810. To avoid repetition, details are not described herein again.

Optionally, the processor 810 is specifically configured to use an index number as the first indication information. A first correspondence exists between the index number and the coding method.

Optionally, the first correspondence is indicated as a modulation and coding scheme MCS table, and the MCS table includes the index number and the coding method corresponding to the index number.

Optionally, the MCS table further includes a modulation order corresponding to the index number.

Optionally, the processor 810 is specifically configured to use a service channel type and/or a transmission time interval TTI type as the first indication information. A second correspondence exists between the service channel type and/or transmission time interval TTI type and the coding method.

Optionally, the processor 810 is specifically configured to use a feedback delay type as the first indication information. A correspondence exists between the feedback delay type and the coding method.

Optionally, the first indication information determined by the processor 810 is specifically further used to indicate a feedback delay type. A third correspondence exists between the first indication information and the feedback delay type.

Optionally, the control signaling sent by the transmitter 840 further includes second indication information. The second indication information is used to indicate a feedback delay type.

Specifically, before the transmitter 840 sends the control signaling to the terminal device, the processor 810 is specifically further configured to determine the second indication information.

Optionally, the feedback delay type is a quantity of subframes in an interval between a subframe for service data transmission and a subframe for feedback information transmission.

Optionally, for a communications system in time division multiplexing TDD mode, the quantity of subframes in the interval is 0 when one subframe corresponds to one TTI length and the one subframe includes a downlink transmission time and an uplink transmission time.

Optionally, the transmitter 840 is further configured to send service data to the terminal device. The coding method is used for the service channel over which the service data is sent.

The apparatus 800 may further include a receiver 850. The receiver 850 is configured to receive feedback information sent by the terminal device.

Optionally, a subframe for transmitting the feedback information is determined by the terminal device according to the feedback delay type.

Optionally, the control signaling sent by the transmitter 840 is scheduling signaling.

Optionally, the coding method includes at least one of polar coding, rateless Rateless coding, Turbo coding, low-density parity-check coding LDPC coding, convolutional coding, or the like.

It should be understood that the apparatus 800 for data transmission according to this embodiment of the present invention may correspond to the base station in the method embodiments of the present invention. In addition, the foregoing and other operations and/or functions of modules in the apparatus 800 are intended to implement corresponding processes of the methods 100 in FIG. 1 to FIG. 5. For brevity, details are not described herein again.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

Figure 12:
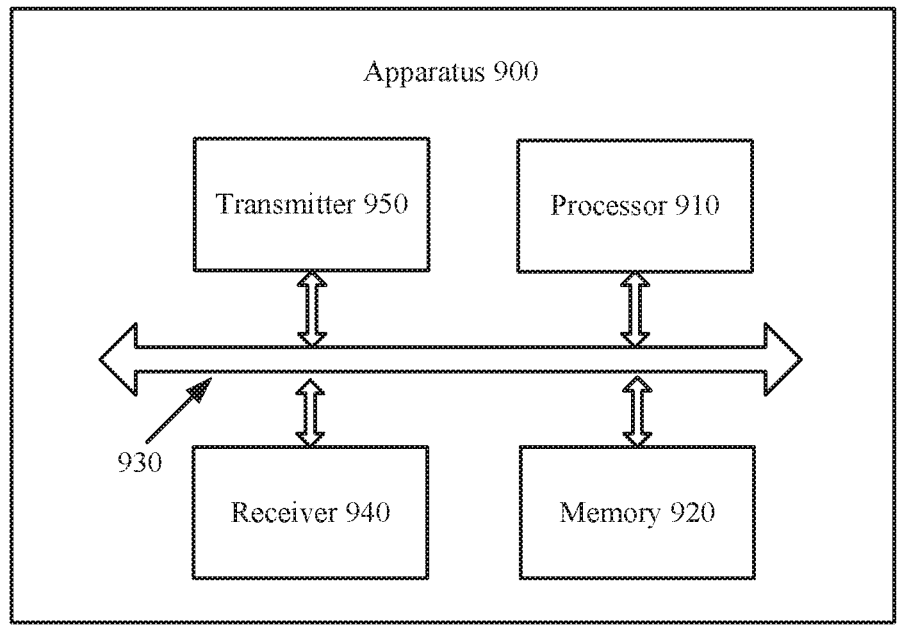
FIG. 12 is a block diagram of a terminal device for data transmission according to another embodiment of the present invention.

As shown in FIG. 12, an embodiment of the present invention further provides an apparatus 900 for data transmission. The apparatus 900 includes a processor 910, a memory 920, a bus system 930, and a receiver 940. The processor 910, the memory 920, and the receiver 940 are connected by using the bus system 930. The memory 920 is configured to store an instruction. The processor 910 is configured to execute the instruction stored in the memory 920, to control the receiver 940 to receive a signal.

The receiver 940 is configured to receive control signaling sent by a base station. The control signaling includes first indication information, and the first indication information is used to indicate a coding method that needs to be used for a service channel of to-be-transmitted data.

The processor 910 is configured to determine, according to the first indication information, the coding method that needs to be used for the service channel.

Specifically, after receiving the control signaling sent by the base station, the terminal device obtains the first indication information included in the control signaling, and obtains, according to the indication information, the coding method used for the service channel over which the base station needs to send data. The terminal device may receive, according to the coding method, the data sent by the base station.

Therefore, in this embodiment of the present invention, the terminal device can determine coding methods for different to-be-transmitted data according to the first indication information sent by the base station, and further, can receive different to-be-transmitted data sent by the base station. This is applicable to different scenarios, and can thereby improve flexibility in use.

It should be noted that the foregoing method embodiments of the present invention may be applied to a processor or be implemented by a processor. The processor may be an integrated circuit chip and has a signal processing capability. In an implementation process, steps in the foregoing method embodiments may be completed by using an integrated logic circuit of hardware in the processor or by using an instruction in a form of software. The foregoing processor may be a general purpose processor, a digital signal processor, an application-specific integrated circuit ASIC, a field programmable gate array FPGA or another programmable logic device, a discrete gate or a transistor logic device, or a discrete hardware component, and can implement or execute the methods, steps, and logical block diagrams disclosed in the embodiments of the present invention. The general purpose processor may be a microprocessor, or the processor may be any conventional processor or the like. The steps of the methods disclosed with reference to the embodiments of the present invention may be directly executed by a hardware decoding processor, or may be executed by using a combination of hardware in a decoding processor and a software module. The software module may be located in a storage medium that is mature in the art, such as a random access memory, a flash memory, a read-only memory, a programmable read-only memory, an electrically erasable programmable memory, or a register. The storage medium is located in a memory. The processor reads information in the memory, and completes the steps of the foregoing methods in combination with the hardware of the processor.

It can be understood that the memory in this embodiment of the present invention may be a volatile memory or a nonvolatile memory, or may include both a volatile memory and a nonvolatile memory. The nonvolatile memory may be a read-only memory ROM, a programmable ROM PROM, an erasable programmable read only memory EPROM, an electrically erasable programmable read-only memory EEPROM, or a flash memory. The volatile memory may be a random access memory RAM and is configured as an external cache. By means of illustrative rather than limitative description, multiple forms of RAMs are available, for example, a static random access memory SRAM, a dynamic random access memory DRAM, a synchronous dynamic random access memory SDRAM, a double data rate synchronous dynamic random access memory DDR SDRAM, an enhanced synchronous dynamic random access memory ESDRAM, a synchlink DRAM SLDRAM, and a direct rambus random access memory DR RAM. It should be noted that a memory in a system and the method that are described in this specification is intended to include but is not limited to these memories and any other appropriate types of memories.

In addition to a data bus, the bus system 930 may further include a power bus, a control bus, a status signal bus, and the like. However, for clear description, various buses in the figure are all marked as the bus system 930.

In an implementation process, the steps of the foregoing methods may be completed by using an integrated logic circuit of hardware in the processor 910 or by using an instruction in a form of software. The steps of the methods disclosed with reference to the embodiments of the present invention may be directly executed by a hardware processor, or may be executed by a combination of hardware in a processor and a software module. The software module may be located in a storage medium that is mature in the art, such as a random access memory, a flash memory, a read-only memory, a programmable read-only memory, an electrically erasable programmable memory, or a register. The storage medium is located in the memory 920. The processor 910 reads information in the memory 920, and completes the steps in the foregoing methods in combination with hardware of the processor 910. To avoid repetition, details are not described herein again.

Optionally, the receiver 940 is further configured to receive service data sent by the base station. Specifically, the coding method is used for the service channel over which the service data is transmitted. The apparatus 900 further includes a transmitter 950, configured to send feedback information to the base station.

Optionally, before the transmitter sends the feedback information to the base station, the processor 910 is further configured to determine, according to the first indication information included in the control signaling received by the receiver 940, a subframe for transmitting the feedback information.

Specifically, the transmitter 950 is specifically configured to send the feedback information to the base station in the subframe.

Optionally, the first indication information may be an index number, and a first correspondence exists between the index number and the coding method.

Optionally, the first correspondence is indicated as a modulation and coding scheme MCS table, and the MCS table includes the index number and the coding method corresponding to the index number.

Optionally, the MCS table further includes a modulation order corresponding to the index number.

Optionally, the first indication information is a service channel type and/or a transmission time interval TTI type, and a second correspondence exists between the service channel type and/or the TTI type and the coding method.

Optionally, the first indication information is a feedback delay type, and a correspondence exists between the feedback delay type and the coding method.

Optionally, the first indication information is further used to indicate a feedback delay type, and a third correspondence exists between the first indication information and the feedback delay type. The processor 910 is specifically further configured to determine, according to the feedback delay type, a subframe for transmitting the feedback information.

Optionally, the control signaling received by the receiver 940 further includes second indication information. The second indication information is used to indicate a feedback delay type of the feedback information. Before the transmitter 950 sends the feedback information to the base station, the processor 910 is specifically further configured to determine, according to the second indication information, a subframe for transmitting the feedback information. The transmitter 950 is specifically further configured to send the feedback information to the base station in the subframe.

Optionally, the feedback delay type is a quantity of subframes in an interval between a subframe for service data transmission and a subframe for feedback information transmission.

Optionally, for a communications system in time division multiplexing TDD mode, the quantity of subframes in the interval is 0 when one subframe corresponds to one TTI length and the one subframe includes a downlink transmission time and an uplink transmission time.

Optionally, the control signaling received by the receiver 940 is scheduling signaling.

Optionally, the coding method includes at least one of polar coding, rateless Rateless coding, Turbo coding, low-density parity-check coding LDPC coding, convolutional coding, or the like.

It should be understood that the apparatus 900 for data transmission according to this embodiment of the present invention may correspond to the terminal device in the method embodiments of the present invention. In addition, the foregoing and other operations and/or functions of modules in the apparatus 900 are intended to implement corresponding processes of the methods 200 in FIG. 6 and FIG. 7. For brevity, details are not described herein again.

Therefore, according to the data transmission method in this embodiment of the present invention, the base station sends the first indication information to the terminal device, to indicate the coding method that needs to be used for the service channel of the to-be-transmitted data. The first indication information may further indicate the feedback delay type to be used when the terminal device detects data transmission. Alternatively, the base station sends, to the terminal device, the second indication information that indicates the feedback delay type. The terminal device determines, according to the feedback delay type, the subframe for transmitting the feedback information. In this way, different coding methods can be used for service channels of data service transmission, and requirements of different feedback delay types for different scenarios or services can be satisfied.

It should be understood that the term "and/or" in this specification is merely an associative relationship for describing associated objects and indicates that three relationships may exist. For example, A and/or B may indicate the following three cases: A alone exists, both A and B exist, and B alone exists. In addition, the character "/" in this specification generally indicates that there is an "or" relationship between former and latter associated objects.

It should be understood that, in the embodiments of the present invention, sequence numbers of the foregoing processes do not indicate an execution sequence. The execution sequence of the processes should be determined according to functions and internal logic of the processes, but should not constitute any limitation on implementation processes of the embodiments of the present invention.

A person of ordinary skill in the art may be aware that units and algorithm steps in examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such an implementation goes beyond the scope of the present application.

It may be clearly understood by a person skilled in the art that, for the purpose of convenient and brief description, for detailed working processes of the foregoing systems, apparatuses, and units, reference may be made to corresponding processes in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, multiple units or components may be combined or may be integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network units. Some or all of the units may be selected according to actual needs, to achieve the objectives of the solutions in the embodiments.

In addition, functional units in the embodiments of the present invention may be integrated into one processing unit, or each of the units may exist alone physically, or two or more units may be integrated into one unit.

When the functions are implemented in a form of a software functional unit, and are sold or used as an independent product, the functions may be stored in a computer readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory ROM, a random access memory RAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method, comprising:
   determining first indication information that includes a service channel type corresponding to a service channel of which data is to be transmitted and/or a transmission time interval TTI type corresponding to the TTI at which the data is to be transmitted, wherein the first indication information is used to indicate a coding method that is to be used for the service channel and a first correspondence exists between the service channel type and/or transmission time interval TTI type and the coding method; and
   sending control signaling to a terminal device, wherein the control signaling comprises the first indication information, whereby the coding method that is to be used for the service channel can be determined based on the first indication information.

2. The method according to claim 1, wherein the determining first indication information comprises:
   using an index number as the first indication information, wherein a second correspondence exists between the index number and the coding method.

3. The method according to claim 1, wherein the determining first indication information comprises:
   using a feedback delay type as the first indication information, wherein a correspondence exists between the feedback delay type and the coding method.

4. The method according to of claim 1, wherein the control signaling further comprises second indication information, and the second indication information is used to indicate a feedback delay type; and
   before the sending control signaling to a terminal device, the method further comprises:
   determining the second indication information.

5. A data transmission method, comprising:
   receiving control signaling sent by a base station, wherein the control signaling comprises first indication information, that includes a service channel type corresponding to a service channel of which data is to be transmitted and/or a transmission time interval TTI type corresponding to the TTI at which the data is to be transmitted, wherein the first indication information is used to indicate a coding method that is to be used for the service channel of to-be-transmitted data, and a first correspondence exists between the service channel type and/or the TTI type and the coding method; and determining, according to the first indication information, the coding method that is to be used for the service channel.

6. The method according to claim 5, wherein the first indication information is an index number, and a second correspondence exists between the index number and the coding method.

7. The method according to claim 5, wherein the first indication information is a feedback delay type, and a correspondence exists between the feedback delay type and the coding method.

8. The method according to claim 5, wherein the control signaling further comprises second indication information, and the second indication information is used to indicate a feedback delay type of the feedback information.

9. A base station, comprising:
a processor, configured to determine first indication information that includes a service channel type corresponding to a service channel of which data is to be transmitted and/or a transmission time interval TTI type corresponding to the TTI at which the data is to be transmitted, wherein the first indication information is used to indicate a coding method that is to be used for a service channel of to-be-transmitted data and a first correspondence exists between the service channel type and/or transmission time interval TTI type and the coding method; and
a transmitter, configured to send control signaling to a terminal device, wherein the control signaling comprises the first indication information, whereby the coding method that is to be used for the service channel can be determined based on the first indication information.

10. The base station according to claim 9, wherein the processor is specifically configured to:
use an index number as the first indication information, wherein a first correspondence exists between the index number and the coding method.

11. The base station according to claim 9, wherein the processor is specifically configured to:
use a feedback delay type as the first indication information, wherein a correspondence exists between the feedback delay type and the coding method.

12. The base station according to claim 9, wherein the control signaling sent by the transmitter further comprises second indication information, and the second indication information is used to indicate a feedback delay type; and
before the transmitter sends the control signaling to the terminal device, the processing unit is specifically further configured to:
determine the second indication information.

13. A terminal device, comprising:
a receiver, configured to receive control signaling sent by a base station, wherein the control signaling comprises first indication information including a service channel type corresponding to a service channel of which data is to be transmitted and/or a transmission time interval TTI type corresponding to the TTI at which the data is to be transmitted, wherein the first indication information is used to indicate a coding method that is to be used for the service channel of to-be-transmitted data, and is a first correspondence exists between the service channel type and/or the TTI type and the coding method; and
a processor, configured to determine, according to the first indication information, the coding method that is to be used for the service channel.

14. The terminal device according to claim 13, wherein the first indication information is an index number, and a second correspondence exists between the index number and the coding method.

15. The terminal device according to claim 13, wherein the first indication information is a feedback delay type, and a correspondence exists between the feedback delay type and the coding method.

16. The terminal device according to claim 13, wherein the control signaling received by the receiver further comprises second indication information, and the second indication information is used to indicate a feedback delay type of the feedback information.

* * * * *

UNITED STATES PATENT AND TRADEMARK OFFICE
CERTIFICATE OF CORRECTION

PATENT NO. : 10,631,276 B2
APPLICATION NO. : 15/923389
DATED : April 21, 2020
INVENTOR(S) : Jun Chen et al.

It is certified that error appears in the above-identified patent and that said Letters Patent is hereby corrected as shown below:

On the Title Page

In item (73), in Column 1, in "Assignee", Line 1, delete "Inc.," and insert -- Ltd., --.

In the Specification

In Column 1, Line 7, delete "international" and insert -- International --.

In the Claims

In Column 36, Line 49, in Claim 4, delete "to of" and insert -- to --.

Signed and Sealed this
Thirty-first Day of May, 2022

Katherine Kelly Vidal
*Director of the United States Patent and Trademark Office*